:ivance

(12) United States Patent
Jiang

(10) Patent No.: US 11,201,867 B1
(45) Date of Patent: Dec. 14, 2021

(54) BINDING SERVER ACCOUNTS

(71) Applicant: Alipay Labs (Singapore) Pte. Ltd., Singapore (SG)

(72) Inventor: Haijian Jiang, Hangzhou (CN)

(73) Assignee: ALIPAY LABS (SINGAPORE) PTE. Ltd., Singapore (SG)

( * ) Notice: Subject to any disclaimer, the term of this patent is extended or adjusted under 35 U.S.C. 154(b) by 0 days.

(21) Appl. No.: 17/363,408

(22) Filed: Jun. 30, 2021

(30) Foreign Application Priority Data

Sep. 28, 2020 (CN) .......................... 202011039604.9

(51) Int. Cl.
*G06F 21/45* (2013.01)
*G06F 21/41* (2013.01)
*H04L 29/06* (2006.01)
*G06Q 20/10* (2012.01)
*H04L 29/08* (2006.01)
*G06F 21/62* (2013.01)

(52) U.S. Cl.
CPC ....... *H04L 63/0876* (2013.01); *G06Q 20/102* (2013.01); *H04L 67/306* (2013.01)

(58) Field of Classification Search
None
See application file for complete search history.

(56) References Cited

U.S. PATENT DOCUMENTS

2016/0321745 A1* 11/2016 Zhang ................. G06Q 40/02
2018/0365727 A1* 12/2018 Liu .................... G06Q 30/0239

OTHER PUBLICATIONS

CN107104923. English Translation. (Year: 2017).*
CN109525604. English Translation. (Year: 2019).*
CN111817999. English Translation. (Year: 2020).*
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

*Primary Examiner* — Venkat Perungavoor
(74) *Attorney, Agent, or Firm* — Fish & Richardson P.C.

(57) ABSTRACT

One or more embodiments of the present specification relate to a data processing method for binding server accounts. An example method includes, in response to obtaining a binding request, determining a first account, and sending binding request feedback data to a terminal device. In response to obtaining binding object selection data that indicates a selection of candidate binding objects presented by the terminal device, a respective target binding object is determined for each selected candidate binding object, and a respective target server is determined for each target binding object. For each target server, the first account is bound to a second account of the target server.

22 Claims, 12 Drawing Sheets

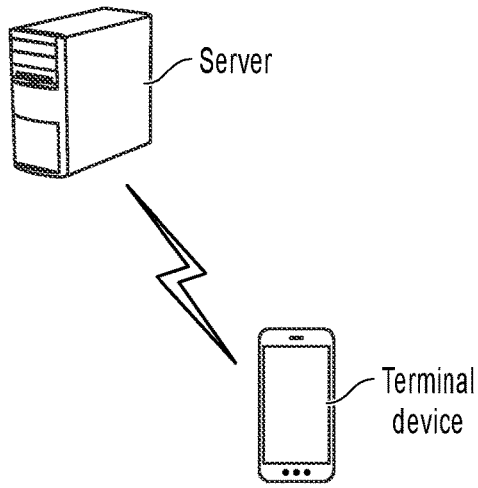

FIG. 1

Obtain a user binding request sent by a terminal device, determine a first to-be-bound account on a first server, and send user binding request feedback data to the terminal device so that the terminal device displays candidate binding objects — S101

Obtain binding object selection data sent by the terminal device, determine respective target binding objects based on the binding object selection data, and determine one or more target servers among servers corresponding to each of the respective target binding objects — S103

Bind the first account to a second account on each target server, and send an account binding request to each target server so that the target server binds the second account on the target server to the first account, where the second account corresponds to the same user identity data as the first account — S105

FIG. 2

BINDING SERVER ACCOUNTS

CROSS-REFERENCE TO RELATED APPLICATIONS

This application claims priority to Chinese Patent Application No. 202011039604.9, filed on Sep. 28, 2020, which is hereby incorporated by reference in its entirety.

TECHNICAL FIELD

The present application relates to the field of computer technologies, and in particular, to methods, apparatuses, devices, and media for data processing and resource transfer.

BACKGROUND

In existing technologies, people can use a variety of Internet services through Internet accounts. Some Internet services enable users to bind different Internet accounts to satisfy service needs or to improve user experience.

SUMMARY

Embodiments of the present specification provide methods, apparatuses, devices, and media for data processing, resource transfer, and payment, so as to solve the technical problem of how to more efficiently process data related to an account binding service.

To solve the above-mentioned technical problem, the embodiments of the present specification provide the following technical solutions.

Some embodiments of the present specification provide a first data processing method, applied to a first server, including the following: obtaining a user binding request sent by a terminal device, determining a first to-be-bound account on the first server, and sending user binding request feedback data to the terminal device so that the terminal device displays candidate binding objects; obtaining binding object selection data sent by the terminal device, determining respective target binding objects based on the binding object selection data, and determining one or more target servers among servers corresponding to each of the respective target binding objects; and binding the first account to a second account on each target server, and sending an account binding request to each target server so that the target server binds the second account on the target server to the first account, where the second account corresponds to the same user identity data as the first account.

Some embodiments of the present specification provide a second data processing method, applied to a second server, including the following: if an identity authentication request or a binding consulting request sent by a first server is obtained, where the identity authentication request or the binding consulting request includes user identity data corresponding to a first account, determining a second account on the second server corresponding to the same user identity data as the first account, where the first account is an account on the first server; sending authentication feedback data or consultation feedback data to the first server, where the authentication feedback data or the consultation feedback data includes account data of the second account, so that the first server determines one or more target servers and sends an account binding request to each target server; and if the account binding request sent by the first server is obtained, binding the second account to the first account.

Some embodiments of the present specification provide a first resource transfer method, applied to a third server, including the following: obtaining a first resource transfer request sent by a terminal device, and determining a third account and a fourth account for which resource transfer is to be performed, and a resource transfer amount, where the third account is an account on the third server, and the third account is bound to the fourth account by using the above-mentioned first or second data processing method; and sending a second resource transfer request to a fourth server on which the fourth account is located, so that the fourth server decreases a resource of the fourth account by the resource transfer amount; obtaining resource transfer feedback data sent by the fourth server, and if it is determined, based on the resource transfer feedback data, that the resource of the fourth account is decreased by the resource transfer amount, increasing a resource of the third account by the resource transfer amount; or decreasing a resource of the third account by the resource transfer amount, and sending a second resource transfer request to a fourth server on which the fourth account is located, so that the fourth server increases a resource of the fourth account by the resource transfer amount.

Some embodiments of the present specification provide a second resource transfer method, applied to a fourth server, including the following: if a resource transfer request sent by a third server is obtained, determining a fourth account on the fourth server for which resource transfer is to be performed, and determining a resource transfer amount; decreasing a resource of the fourth account by the resource transfer amount, and sending resource transfer feedback data to the third server, so that the third server increases a resource of a third account for which resource transfer is to be performed by the resource transfer amount; or if it is determined, based on the resource transfer request, that the third server decreases a resource of a third account for which resource transfer is to be performed by the resource transfer amount, increasing a resource of the fourth account by the resource transfer amount, where the third account is an account on the third server, and the third account is bound to the fourth account by using the above-mentioned first or second data processing method.

Some embodiments of the present specification provide a first payment method, applied to a fifth server, including the following: obtaining a first payment request sent by a terminal device, and determining a fifth account, a sixth account from which funds are to be deducted, and a payment amount, where the fifth account is a user login account on the fifth server, and the fifth account is bound to the sixth account by using the above-mentioned first or second data processing method; and sending a second payment request to a sixth server on which the sixth account is located, so that the sixth server decreases the funds in the sixth account by the payment amount.

Some embodiments of the present specification provide a second payment method, applied to a sixth server, including the following: if a payment request sent by a fifth server is obtained, determining a sixth account on the sixth server from which funds are to be deducted, and determining a payment amount; and decreasing the funds in the sixth account by the payment amount, and sending payment feedback data to the fifth server, where the sixth account is bound to a fifth account on the fifth server by using the above-mentioned first or second data processing method, the fifth account is a user login account on the fifth server, and the fifth account is used to receive a payment request sent by a terminal device.

Some embodiments of the present specification provide a data processing apparatus, including the following: a preparatory binding module, configured to obtain a user binding request sent by a terminal device, determine a first to-be-bound account on the apparatus, and send user binding request feedback data to the terminal device so that the terminal device displays candidate binding objects; an initial binding module, configured to obtain binding object selection data sent by the terminal device, determine respective target binding objects based on the binding object selection data, and determine one or more target servers among servers corresponding to each of the respective target binding objects; and an account binding module, configured to: bind the first account to a second account on each target server, and send an account binding request to each target server so that the target server binds the second account on the target server to the first account, where the second account corresponds to the same user identity data as the first account.

Some embodiments of the present specification provide a data processing apparatus, including the following: a preparatory binding module, configured to: if an identity authentication request or a binding consulting request sent by a first server is obtained, where the identity authentication request or the binding consulting request includes user identity data corresponding to a first account, determine a second account on the apparatus corresponding to the same user identity data as the first account, where the first account is an account on the first server; and send authentication feedback data or consultation feedback data to the first server, where the authentication feedback data or the consultation feedback data includes account data of the second account, so that the first server determines one or more target servers and sends an account binding request to each target server; and an account binding module, configured to: if the account binding request sent by the first server is obtained, bind the second account to the first account.

Some embodiments of the present specification provide a resource transfer apparatus, including the following: a transfer initiation module, configured to obtain a first resource transfer request sent by a terminal device, and determine a third account and a fourth account for which resource transfer is to be performed, and a resource transfer amount, where the third account is an account on the apparatus, and the third account is bound to the fourth account by using the above-mentioned first or second data processing method; and a transfer module, configured to send a second resource transfer request to a fourth server on which the fourth account is located, so that the fourth server decreases a resource of the fourth account by the resource transfer amount; obtain resource transfer feedback data sent by the fourth server, and if it is determined, based on the resource transfer feedback data, that the resource of the fourth account is decreased by the resource transfer amount, increase a resource of the third account by the resource transfer amount; or decrease a resource of the third account by the resource transfer amount, and send a second resource transfer request to a fourth server on which the fourth account is located, so that the fourth server increases a resource of the fourth account by the resource transfer amount.

Some embodiments of the present specification provide a resource transfer apparatus, including the following: a transfer acceptance module, configured to: if a resource transfer request sent by a third server is obtained, determine a fourth account on the apparatus for which resource transfer is to be performed, and determine a resource transfer amount; and a transfer module, configured to decrease a resource of the fourth account by the resource transfer amount, and send resource transfer feedback data to the third server, so that the third server increases a resource of a third account for which resource transfer is to be performed by the resource transfer amount; or if it is determined, based on the resource transfer request, that the third server decreases a resource of a third account for which resource transfer is to be performed by the resource transfer amount, increase a resource of the fourth account by the resource transfer amount, where the third account is an account on the third server, and the third account is bound to the fourth account by using the above-mentioned first or second data processing method.

Some embodiments of the present specification provide a payment apparatus, including the following: a payment initiation module, configured to obtain a first payment request sent by a terminal device, and determine a fifth account, a sixth account from which funds are to be deducted, and a payment amount, where the fifth account is a user login account on the apparatus, and the fifth account is bound to the sixth account by using the above-mentioned first or second data processing method; and a payment module, configured to send a second payment request to a sixth server on which the sixth account is located, so that the sixth server decreases the funds in the sixth account by the payment amount.

Some embodiments of the present specification provide a payment apparatus, including the following: a payment acceptance module, configured to: if a payment request sent by a fifth server is obtained, determine a sixth account on the apparatus from which funds are to be deducted, and determine a payment amount; and a payment module, configured to decrease the funds in the sixth account by the payment amount, and send payment feedback data to the fifth server, where the sixth account is bound to a fifth account on the fifth server by using the above-mentioned first or second data processing method, the fifth account is a user login account on the fifth server, and the fifth account is used to receive a payment request sent by a terminal device.

Some embodiments of the present specification provide a data processing device, including the following: at least one processor; and a memory communicatively connected to the at least one processor, where the memory stores an instruction that can be executed by the at least one processor, and the instruction is executed by the at least one processor to enable the at least one processor to perform the above-mentioned first or second data processing method.

Some embodiments of the present specification provide a resource transfer device, including the following: at least one processor; and a memory communicatively connected to the at least one processor, where the memory stores an instruction that can be executed by the at least one processor, and the instruction is executed by the at least one processor to enable the at least one processor to perform the above-mentioned first or second resource transfer method.

Some embodiments of the present specification provide a payment device, including the following: at least one processor; and a memory communicatively connected to the at least one processor, where the memory stores an instruction that can be executed by the at least one processor, and the instruction is executed by the at least one processor to enable the at least one processor to perform the above-mentioned first or second payment method.

Some embodiments of the present specification provide a computer-readable storage medium, where the computer-readable storage medium stores a computer-executable instruction, and the computer-executable instruction is executed by a processor to implement the above-mentioned first or second data processing method.

Some embodiments of the present specification provide a computer-readable storage medium, where the computer-readable storage medium stores a computer-executable instruction, and the computer-executable instruction is executed by a processor to implement the above-mentioned first or second resource transfer method.

Some embodiments of the present specification provide a computer-readable storage medium, where the computer-readable storage medium stores a computer-executable instruction, and the computer-executable instruction is executed by a processor to implement the above-mentioned first or second payment method.

At least one of the above-mentioned technical solutions used in the embodiments of the present specification can achieve the following beneficial effects:

One-to-many account binding can be implemented at one single time, thereby improving account binding efficiency, and improving efficiency of resource transfer and payment between bound accounts.

BRIEF DESCRIPTION OF DRAWINGS

To describe the embodiments of the present specification or the technical solutions in the existing technology more clearly, the following briefly describes the accompanying drawings for describing the embodiments of the present specification or the existing technology. Clearly, the accompanying drawings in the following descriptions merely show some embodiments of the present specification, and a person of ordinary skill in the art can still derive other drawings from these accompanying drawings without creative efforts.

FIG. 1 is a schematic diagram illustrating an execution body of a data processing method, according to a first embodiment of the present specification;

FIG. 2 is a schematic flowchart illustrating a data processing method, according to a first embodiment of the present specification;

DESCRIPTION OF EMBODIMENTS

To make a person skilled in the art better understand the technical solutions in the present specification, the following clearly and fully describes the technical solutions in the embodiments of the present specification with reference to the accompanying drawings in the embodiments of the present specification. Clearly, the described implementations are merely some but not all of the embodiments of the present application. All other embodiments obtained by a person of ordinary skill in the art based on the embodiments of the present specification without creative efforts should fall within the protection scope of the present application.

In existing technologies, people can use a variety of Internet services through Internet accounts. Some Internet services enable users to bind different Internet accounts to satisfy service needs or to improve user experience.

A first embodiment (hereinafter referred to as "the present embodiment") of the present specification provides a data processing method, and an execution body of the present embodiment can be a terminal device (including but not limited to a mobile phone, a computer, a pad, and a television), a server, an operating system, a data processing platform, a data processing system, etc., that is, the execution body can be diverse, and the execution body can be set, used, or transformed as needed. In addition, a third-party application can alternatively be provided to assist the execution body in executing the present embodiment. For example, as shown in FIG. 1, the data processing method in the present embodiment can be performed by a server, an application (corresponding to the server) can be installed on a terminal device (held by a user), data can be transmitted between the terminal device or the application and the server, and the terminal device or the application can be used to collect, input, or output data, or process a page or information (for the user), thereby assisting the server in performing the data processing method in the present embodiment.

Figure 3:
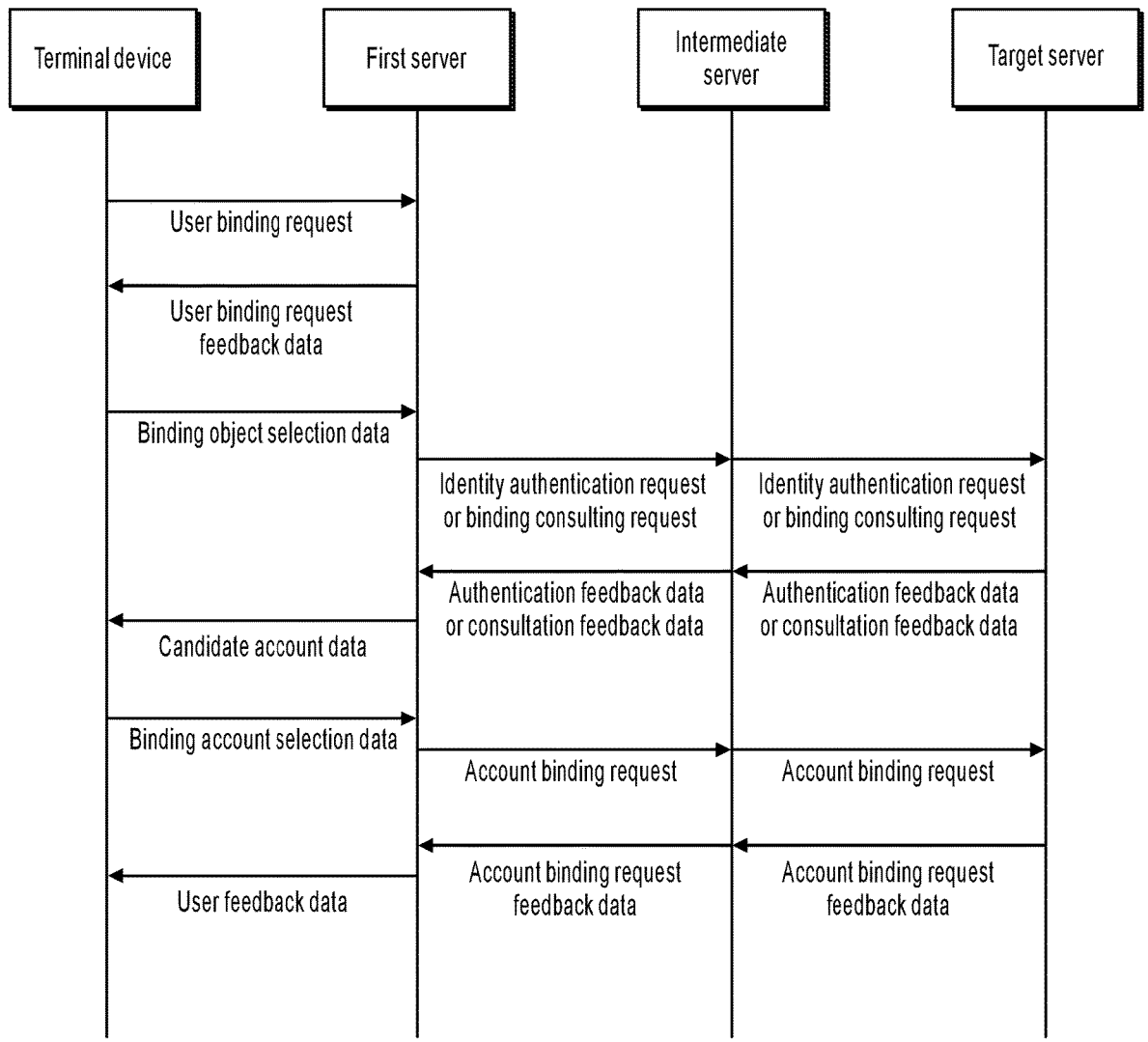
FIG. 3 is a schematic diagram illustrating a data processing procedure, according to a first embodiment of the present specification.

As shown in FIG. 2 and FIG. 3, the data processing method provided by the present embodiment is applied to a first server, and includes the following:

S101: (An execution body) obtains a user binding request sent by a terminal device, determines a first to-be-bound account on the first server, and sends user binding request feedback data to the terminal device so that the terminal device displays candidate binding objects.

In the present embodiment, the execution body can be the first server. The execution body can obtain a user binding request sent by the terminal device (which can be referred to as a "trigger terminal device"), and determine a first to-be-bound account on the first server.

The trigger terminal device can send the user binding request by using a plurality of methods. For example, the above-mentioned corresponding application (which can be referred to as a trigger application) can be installed on the trigger terminal device. When a user opens a corresponding interface of the trigger application, an account binding service is provided for the user through a corresponding option, a button, etc. on the interface. For example, the interface shown in FIG. 4 includes the "I want to bind" option. The user can tap this option to initiate the account binding service. Because the user operates the trigger application to initiate the account binding service, and the first server is a server corresponding to the trigger application, after the user initiates the account binding service, the trigger terminal device can generate a user binding request based on the user operation, and send the user binding request to the first server. Correspondingly, the first server obtains the user binding request sent by the trigger terminal device. Specifically, the first server receives the user binding request sent by the trigger terminal device (receiving a request is a type of obtaining a request).

The first server can determine the first to-be-bound account on the first server based on one or more of method 1.1 or method 1.2 (the present embodiment is not limited to the one or more of method 1.1 or method 1.2).

1.1. The First Account is a Login Account of the Trigger Terminal Device when the User Binding Request is Obtained.

Figure 4:
FIG. 4 is a schematic diagram illustrating a page, according to a first embodiment of the present specification.

When the user operates the trigger application, if the user logs in to an account on the first server through the trigger terminal device (that is, the trigger application on the trigger terminal device), as shown in FIG. 4, after the user initiates the account binding service, the trigger terminal device sends the user binding request to the first server, and the first server can use the user's login account on the trigger terminal device (the account on the first server) as the first to-be-bound account.

1.2. The First Account is Determined Based on the User Binding Request.

Figure 5:
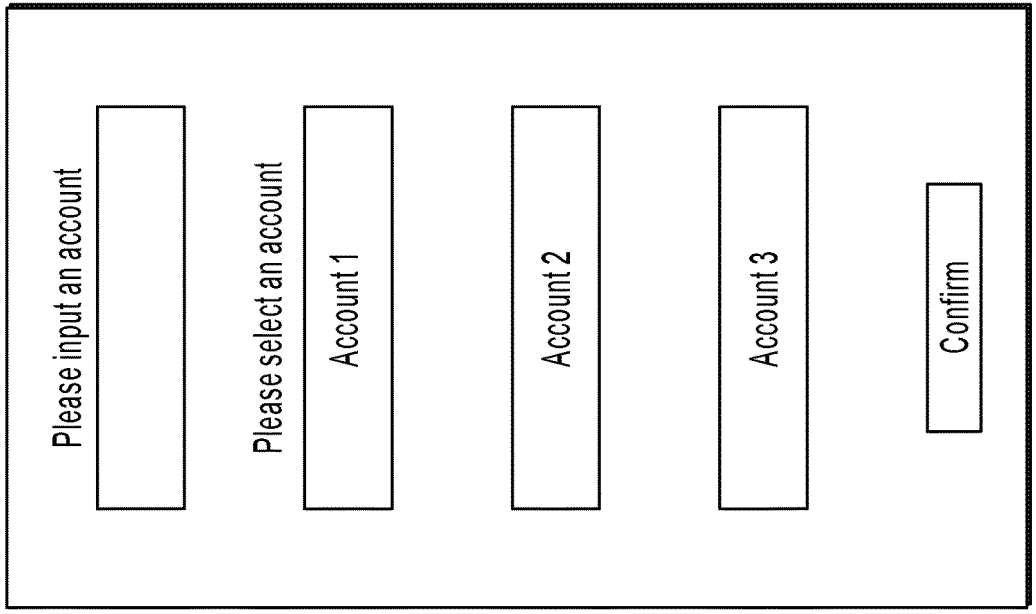
FIG. 5 is a schematic diagram illustrating another page, according to a first embodiment of the present specification.

After the user initiates the account binding service, the trigger application can display a corresponding input box for the user to input account information (such as a user name or an account number), as shown in FIG. 5; because the user operates the trigger application to initiate the account binding service, the user usually should input the account number of the user on the first server; and/or, after the user initiates the account binding service, the trigger application can display an account list of the user (a list of accounts of the user that have been created on the first server) for the user to select an account. For example, FIG. 5 shows a case in which there are three first server accounts, and FIG. 5 is only for illustration and does not represent actual accounts.

The trigger terminal device can include the account input or selected by the user in the user binding request and send the user binding request to the first server, so that the first server can determine the first account based on the user binding request, for example, use the account included in the user binding request as the first to-be-bound account.

Figure 6:
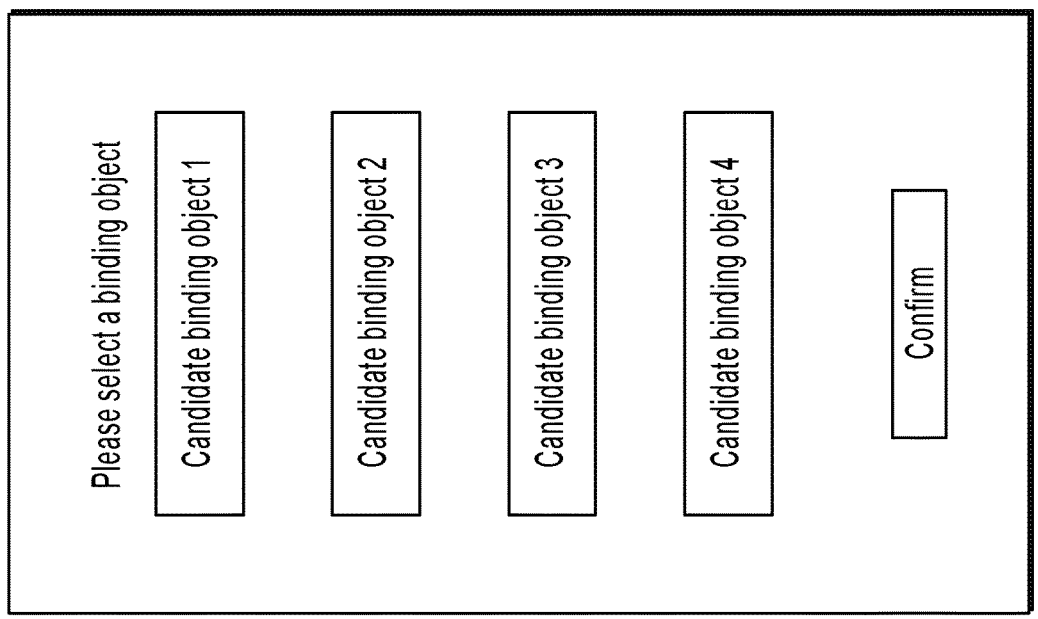
FIG. 6 is a schematic diagram illustrating another page, according to a first embodiment of the present specification.

After determining the first to-be-bound account, the first server can send user binding request feedback data to the trigger terminal device, so that the trigger terminal device displays candidate binding objects. The candidate binding object is an object that can be bound, and the "object" here can be a name of an organization, a name of a service provider, etc. All parties of the first server can pre-build related Internet protocols with each object, such as a data transfer protocol, a data authentication protocol, etc. The objects that build the above-mentioned Internet protocols with the service parties of the first server can be referred to as candidate binding objects, that is, the trigger terminal device can display a list of candidate binding objects for the user to select. For example, FIG. 6 shows a case in which there are four candidate binding objects, and FIG. 6 is only for illustration and does not represent actual object names.

After determining the first to-be-bound account, and before sending the user binding request feedback data to the trigger terminal device, the first server can perform identity authentication or other authentication on the user identity data corresponding to the first account, and then send the user binding request feedback data to the trigger terminal device after the authentication succeeds.

S103: (The execution body) obtains binding object selection data sent by the terminal device, determines respective target binding objects based on the binding object selection data, and determines one or more target servers among servers corresponding to each of the respective target binding objects.

After displaying the candidate binding object, the trigger terminal device can determine the object selected by the user based on the user operation, and send binding object selection data to the first server. The binding object selection data can include the user's selection data of the candidate binding object. The first server obtains the binding object selection data sent by the trigger terminal device, and determines the object selected by the user based on the binding object selection data. The object selected by the user is used as the target binding object. That is, the first server determines respective target binding objects based on the binding object selection data.

After determining respective target binding objects, the first server can determine one or more target servers among the servers corresponding to each of the respective target binding objects, and send an account binding request to each target server. As described above, the "object" can be a name of an organization, a name of a service provider, etc. A server corresponding to any object can be a subordinate server of an organization represented by the object or a server used to provide a service represented by the object.

Specifically, the determining one or more target servers among the servers corresponding to each of the respective target binding objects can be implemented using the following method:

S1031: Before sending an account binding request to each target server, the first server sends an identity authentication request or a binding consulting request to the server corresponding to respective target binding objects, where the identity authentication request or the binding consulting request includes the user identity data corresponding to the first account, so that any server corresponding to respective target binding objects determines a second account on the server corresponding to the same user identity data as the first account.

Specifically, after determining respective target binding objects, the first server can send an identity authentication request or a binding consulting request to the server corresponding to respective target binding objects, where the identity authentication request or the binding consulting request includes the user identity data corresponding to the first account (that is, the user identity data used to register the first account, including but not limited to the user's identity card number or other identity numbers), so that any server corresponding to respective target binding objects determines the second account on the server after receiving the identity authentication request or the binding request. The second account corresponds to the same user identity data as the first account.

For example, the target binding objects include object A, object B, and object C. In this case, the first server can send an identity authentication request or a binding consulting request to a server corresponding to object A, a server corresponding to object B, and a server corresponding to object C, so that the server corresponding to object A determines a second account on the server corresponding to the same user identity data as the first account, the server corresponding to object B determines a second account on the server corresponding to the same user identity data as the first account, and the server corresponding to object C determines a second account on the server corresponding to the same user identity data as the first account. Generally, different target binding objects correspond to different servers. If there are a plurality of target binding objects, there can be a plurality of servers corresponding to each of the respective target binding objects, and there can be a plurality of determined second accounts.

Any server corresponding to the target binding object can send authentication feedback data or consultation feedback data to the first server.

S1033: After sending the identity authentication request or the binding consulting request to any server corresponding to respective target binding objects, the first server obtains authentication feedback data or consultation feedback data sent by any server corresponding to respective target binding objects, and determines the second account on the server based on the authentication feedback data or the consultation feedback data sent by the server.

Specifically, after sending the identity authentication request or the binding consulting request to any server corresponding to respective target binding objects, the first server can obtain the authentication feedback data (corresponding to the identity authentication request) or the consultation feedback data (corresponding to the binding consulting request) sent by any server corresponding to respective target binding objects. The authentication feedback data or the consultation feedback data sent by any server corresponding to respective target binding objects can include account information of the second account determined by the server, and the first server can determine the second account on the server based on the authentication feedback data or the consultation feedback data sent by the server.

S1035: After determining the second account on any server corresponding to respective target binding objects based on the authentication feedback data or the consultation feedback data sent by the server, the first server sends candidate account data to the trigger terminal device, where the candidate account data is used to enable the terminal device to display the second account that is determined by the server corresponding to respective target binding objects.

Figure 7:
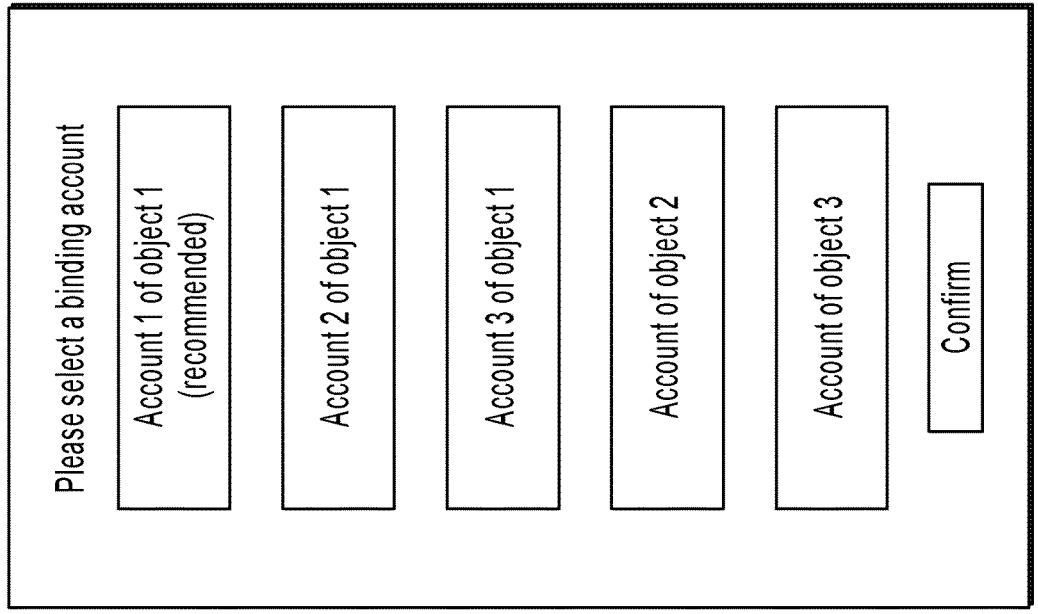
FIG. 7 is a schematic diagram illustrating another page, according to a first embodiment of the present specification.

Specifically, after determining the second account on each server corresponding to respective target binding objects, the first server can send candidate account data to the trigger terminal device. The candidate account data can include the account information of the second account on each server corresponding to respective target binding objects, so that the trigger terminal device displays the second account on each server corresponding to respective target binding objects. The second account can be used as a candidate binding account for the first account, that is, the trigger terminal device can display a list of second accounts for the user to select. For example, as shown in FIG. 7, assume that the user selects candidate binding objects 1 to 3, the server of object 1 has three second accounts, and objects 2 and 3 each have one second account. FIG. 7 is only for illustration and does not represent actual object names.

The following further describes two possible cases.

Case 1: The above-mentioned second account does not exist on one or more servers corresponding to each of the respective target binding objects.

Figure 8:
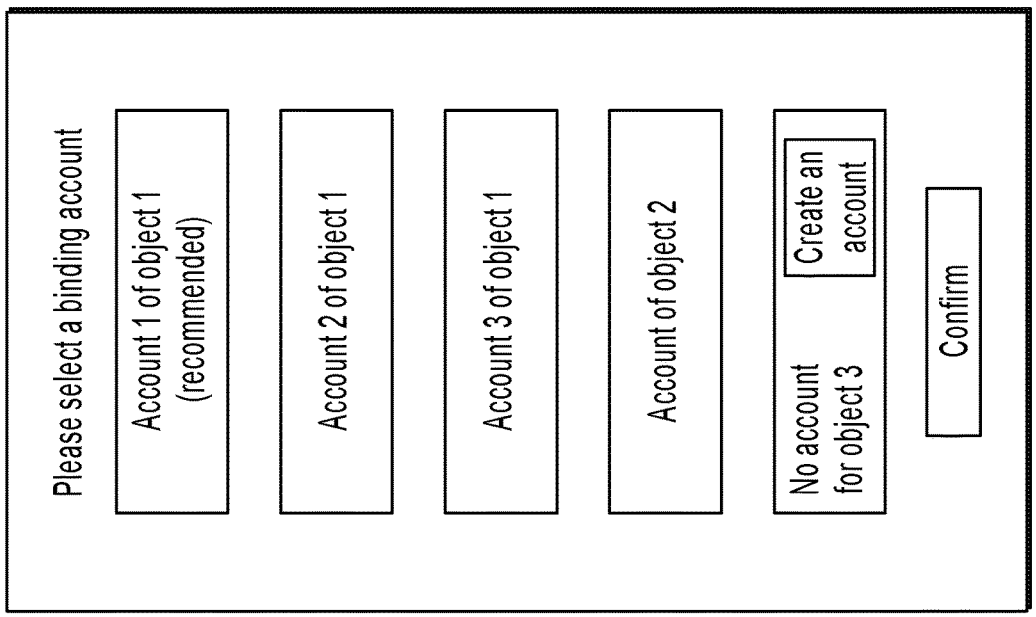
FIG. 8 is a schematic diagram illustrating another page, according to a first embodiment of the present specification.

The above-mentioned second account may not exist on the server corresponding to some target binding objects. Assume that server S1 is the server corresponding to target binding object A (only used as an example and not specific), and server S1 does not have the above-mentioned second account. In this case, after obtaining the authentication feedback data or the consultation feedback data sent by server S1, the first server can determine that the above-mentioned second account does not exist on server S1 based on the authentication feedback data or the consultation feedback data sent by server S1. In this case, the candidate account data is further used to enable the trigger terminal device to display first prompt information, and the first prompt information is used to prompt that there is no account that can be bound to the target binding object corresponding to the server on which the second account does not exist. For example, the server corresponding to object 3 does not have a second account, as shown in FIG. 8. Following the above-mentioned example, the first prompt information is used to prompt that there is no account that can be bound to target binding object A. If there are a plurality of target binding objects for which there is no account that can be bound, respective target binding objects for which there is no account that can be bound can have the above-mentioned first prompt information.

Following the above-mentioned example, if the second account does not exist on a server corresponding to the target binding object, the candidate account data is further used to enable the trigger terminal device to display second prompt information, and the second prompt information is used to prompt a user to create an account for "the target binding object corresponding to the server on which the second account does not exist". For example, the server corresponding to object 3 does not have a second account, and the second prompt information prompts to create the account of object 3, as shown in FIG. 8. Following the above-mentioned example, if the above-mentioned second account does not exist on server S1, the second prompt information is used to prompt the user to create the account of target binding object A, and the account of target binding object A is the account on server S1. If there are a plurality of target binding objects for which there is no account that can be bound, respective target binding objects for which there is no account that can be bound can have the above-mentioned second prompt information. In addition, the second prompt information can be in a form of an option or a button, and the user can create an account by tapping the second prompt information, as shown in FIG. 8, for example.

As described above, if the trigger terminal device displays the second prompt information, the user may need to create an account for "the target binding object corresponding to the server on which the second account does not exist". For example, the user taps the second prompt information. In this case, the trigger terminal device can obtain the user's account creation request, and send the user creation request to the first server. As described above, if there are a plurality of target binding objects for which there is no account that can be bound, respective target binding objects for which there is no account that can be bound can have the above-mentioned second prompt information. In this case, the trigger terminal device can determine a specific target binding object, where second prompt information corresponding to the target binding object has been tapped by the user. In this way, the trigger terminal device can determine a specific target binding object for which the user needs to create an account, and include (object data) of the target binding object for which the user wants to create an account into the user creation request.

Correspondingly, after obtaining the user creation request sent by the trigger terminal device, the first server can determine one or more specific target binding objects for which the user wants to create an account, use servers corresponding to each of the respective target binding objects for which the user wants to create an account as account creation servers, that is, the first server determines one or more account creation servers based on the account creation request.

The first server sends an account creation request to each account creation server, so that each account creation server creates a second account, and the created second account should correspond to the same user identity data as the first account. Because the account creation server is the server corresponding to the target binding object, the account creation server has previously obtained the identity authentication request or the binding consulting request that is sent by the first server and that includes the user identity data corresponding to the first account. Therefore, the account creation request can include or does not have to include the user identity data corresponding to the first account.

Any account creation server can send creation feedback data to the first server, and the creation feedback data can include account data of the created second account.

After sending an account creation request to each account creation server, the first server can obtain creation feedback data sent by any account creation server, and determine the second account to be created by the account creation server based on the creation feedback data sent by the account creation server.

After obtaining the creation feedback data, the first server can send supplemental candidate account data to the trigger terminal device, where the supplemental candidate account data is used to enable the terminal device to display the second account created by each account creation server. Because a server corresponding to some target binding objects has a second account before the first server sends the identity authentication request or the binding consulting request, after the first server sends the supplemental candidate account data to the trigger terminal device, the second account created by each account creation server can be displayed together with "the server corresponding to the target binding object has the second account before the first server sends the identity authentication request or the binding consulting request". For example, the account of the server corresponding to object 3 is created, as shown in FIG. 9.

Case 2: There are a plurality of second accounts on one or more servers corresponding to each of the respective target binding objects.

Figure 9:
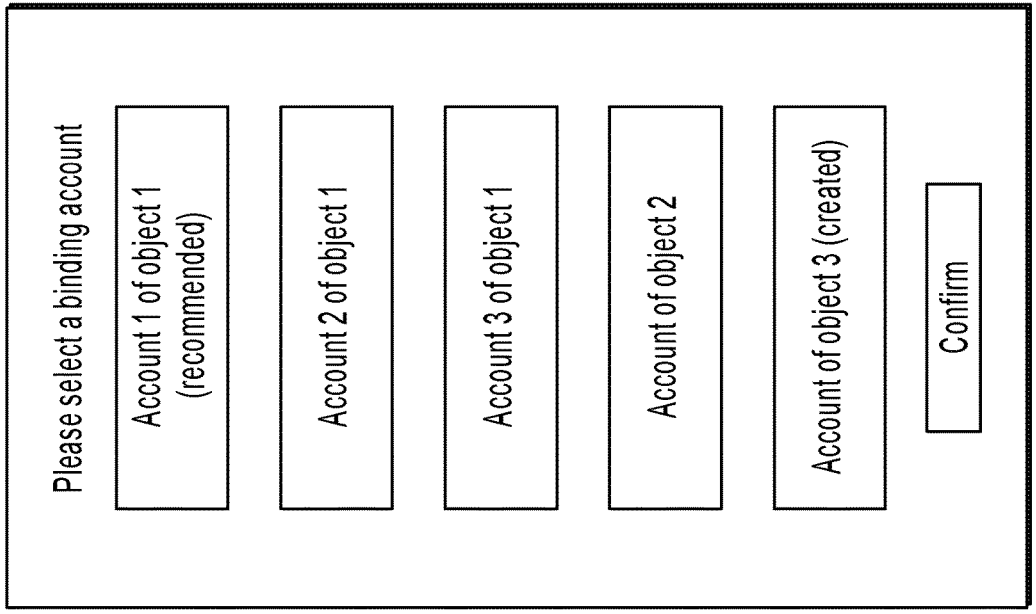
FIG. 9 is a schematic diagram illustrating another page, according to a first embodiment of the present specification.

For any target binding object, if the server corresponding to any target binding object determines a plurality of second accounts after obtaining the identity authentication request or the binding consulting request sent by the first server, the above-mentioned candidate account data is further used to enable the trigger terminal device to display the plurality of second accounts of the server corresponding to the target binding object, for example, as shown in any one of FIG. 7 to FIG. 9.

Assume that server S2 is a server corresponding to target binding object B (only used as an example and not specific), and server S2 determines a plurality of second accounts after receiving the identity authentication request or the binding consulting request sent by the first server. In this case, server S2 can determine one or more recommended second accounts (which can be referred to as "recommended accounts"; a recommended account is a second account recommended to be bound) among the plurality of second accounts on server S2, and include account data of the recommended accounts into the authentication feedback data or the consultation feedback data sent by server S2 to the first server. Server S2 can determine the recommended accounts based on historical account operation data of the plurality of second accounts on server S2.

The first server receives the authentication feedback data or the consultation feedback data sent by server S2, and determines the recommended account on server S2 based on the authentication feedback data or the consultation feedback data sent by server S2. In this case, the above-mentioned candidate account data is further used to enable the trigger terminal device to display the first recommendation information, and the first recommendation information is used to prompt the recommended account. For example, account 1 on the server corresponding to object 1 is a recommended account, as shown in any one of FIG. 7 to FIG. 9. For any target binding object, if the server corresponding to any target binding object has a plurality of second accounts, the target binding object can have the above-mentioned first recommendation information.

In addition, after determining the second account on any server corresponding to respective target binding objects based on the authentication feedback data or the consultation feedback data sent by the server, the first server can further determine the second account recommended to be bound among all the second accounts of the server corresponding to respective target binding objects. The above-mentioned candidate account data is further used to enable the trigger terminal device to display the second recommendation information, and the second recommendation information is used to prompt the recommendation of the "determining the second account recommended to be bound among all the second accounts".

Specifically, the first server can determine the second account recommended to be bound among the second accounts of the server corresponding to respective target binding objects based on the historical interaction data between the first server and the server corresponding to respective target binding objects, that is, "determining the second account recommended to be bound among all the second accounts".

S1037: The determining one or more target servers among servers corresponding to each of the respective target binding objects includes the following: obtaining binding account selection data sent by the terminal device, determining one or more selected second accounts based on the binding account selection data, and using a server on which the one or more selected second accounts are located as the target server.

Specifically, for any target binding object, the second account on the server corresponding to any target binding object is also the second account of the target binding object. After the candidate account data is used to enable the trigger terminal device to display the second account of respective target binding objects, the user can select the second to-be-bound account, so that the trigger terminal device can obtain the user's operation on the second account, and generate binding account selection data and send the binding account selection data to the first server. The binding account selection data can include the second account selected by the user.

The first server obtains the binding account selection data sent by the trigger terminal device, determines one or more second accounts (which can be referred to as selected second accounts) selected (by the user) based on the binding account selection data, and uses the server on which each selected second account is located as the target server. It can be understood that if the selected second accounts come from a plurality of servers, there are a plurality of target servers.

In the present embodiment, the target server can alternatively be determined in other ways. For example, after the user selects the target binding object, the server corresponding to the target binding object is used as the target server.

Generally, the user selects the target binding object, indicating that the user wants to bind the first account to the second account of respective target binding objects. If there is a second account for respective target binding objects, the user selects at least one second account for respective target binding objects, so that the target server is the server corresponding to the target binding object.

S105: Bind the first account to a second account on each target server, and send an account binding request to each target server so that the target server binds the second account on the target server to the first account, where the second account corresponds to the same user identity data as the first account.

After determining one or more target servers, the first account can be bound to a second account on each target server, that is, the first server binds the first account to the second account on each target server, and sends an account binding request to each target server so that the target server binds the second account on the target server to the first account. Specifically, the first account can be bound to each selected second account based on one or more of method 2.1 or method 2.2 (the present embodiment is not limited to the one or more of method 2.1 or method 2.2).

2.1. The Target Server Performs Binding First, and then the First Server Performs Binding.

The first server can send the account binding request to each target server so that the target server binds the second account on the target server to the first account; the first server can obtain account binding request feedback data sent by any target server, and if it is determined, based on the account binding request feedback data, that the target server has bound the second account on the target server to the first account, bind the first account to the second account on the target server.

For example, for any target server S3, the first server sends an account binding request to target server S3, so that target server S3 binds the second account on target server S3 to the first account, that is, the target server first binds the second account on target server S3 to the first account.

Any target server can send account binding request feedback data to the first server, and the first server obtains the (first) account binding request feedback data sent by any target server. If it is determined, based on the account binding request feedback data, that the target server has bound the second account on the target server to the first account, the first server binds the first account to the second account on the target server, that is, the first server then binds the first account to the second account.

Following the above-mentioned example, the first server obtains the account binding request feedback data sent by target server S3. If it is determined, based on the account binding request feedback data sent by target server S3, that target server S3 has bound the second account on target server S3 to the first account, the first server binds the first account to the second account on target server S3.

2.2. The First Server Performs Binding First, and then the Target Server Performs Binding.

After binding the first account to the second account on any target server, the first server sends the account binding request to the target server so that the target server binds the second account on the target server to the first account.

The first server can bind the first account to the second account on each target server, and then make each target server bind the second account on the target server to the first account. For example, for any target server S4, the first server binds the first account to the second account on target server S4, that is, the first server first binds the first account to the second account; and then the first server sends an account binding request to target server S4, so that target server S4 binds the second account on target server S4 to the first account, that is, the target server then binds the second account to the first account.

In method 2.2, after any target server binds the second account on the target server to the first account, the target server can send (second) account binding request feedback data to the first server, and the first server determines, based on the account binding request feedback data, whether the target server has bound the second account on the target server to the first account.

In particular, the account binding request can include user identity data corresponding to the first account.

In method 2.1 or 2.2, for any target server, if there are a plurality of second accounts on any target server, after the target server obtains the account binding request sent by the first server (regardless of the account binding request in method 2.1 or 2.2, hereinafter the same), the target server can bind all the second accounts on the target server to the first account, or the target server can bind one of the second accounts on the target server to the first account.

In method 2.1 or 2.2, for any target server, before any target server binds the second account on the target server to the first account, the target server can perform identity authentication or other authentication on the user identity data corresponding to the first account, and the user identity data corresponding to the second account, and then bind the second account on the target server to the first account after the authentication succeeds.

In the present embodiment, the sending an account binding request to each target server so that the target server binds the second account on the target server to the first account includes the following: sending an account binding request to each target server so that the target server binds one second account on the target server to the first account.

For example, for any target sever S5, if there are a plurality of second accounts on any target server S5, the account binding request sent by the first server enables target server S5 to bind one of the second accounts on target server S5 to the first account.

Specifically, in the present embodiment, for any target server, if there are a plurality of second accounts on any target server, and the user selects one second account of the target server in S1037, the account binding request sent by the first server to the target server can include the second account selected by the user on the target server, so that the target server binds the second account selected by the user to the first account.

The first server binds the first account to the second account, which can specifically mean that the first server itself generates and stores a binding relationship between the first account and the second account. The target server binds the second account to the first account, which can specifically mean that the target server itself generates and stores a binding relationship between the second account and the first account. An account binding protocol or a consensus protocol can be pre-built between the first server and the server corresponding to each candidate binding object, so that the first server and the target server can generate and store the binding relationship between the first account and the second account.

Figure 10:
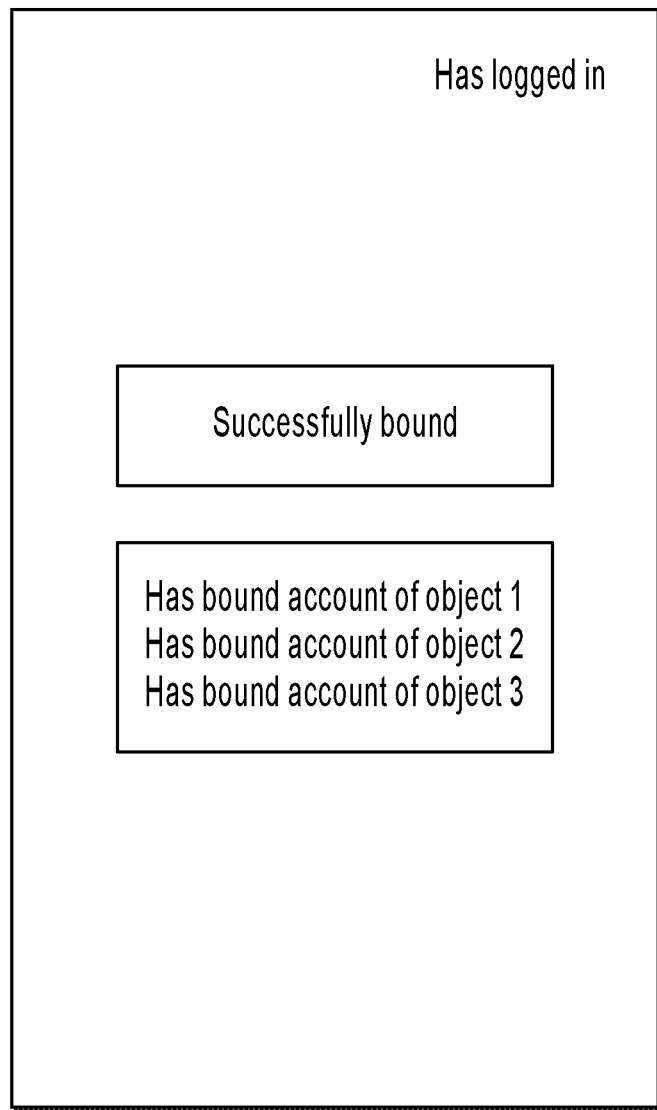
FIG. 10 is a schematic diagram illustrating another page, according to a first embodiment of the present specification.

In addition, the first server can send user feedback data to the trigger terminal device, so that the trigger terminal device displays an account binding result, that is, an account binding result of the first account and the second account, as shown in FIG. 10, for example.

In particular, either the first account or the second account can be a resource storage account or a resource transfer account.

It is worthwhile to note that, when the first server sends any request or any data to any server corresponding to respective target binding objects, the first server may not directly send the request or the data to any server corresponding to respective target binding objects, and instead, the first server sends the request or the data that needs to be sent to an intermediate server, and the intermediate server sends the request or the data that needs to be sent to any server corresponding to respective target binding objects. For example, server S6 is any server corresponding to the target binding object. When the first server sends any request or any data to server S6, the first server may not directly send the request or the data to server S6, and instead, the first server sends the request or the data that needs to be sent to an intermediate server, and the intermediate server sends the request or the data that needs to be sent to server S6.

When any server corresponding to respective target binding objects sends any request or any data to the first server, any server corresponding to respective target binding objects may not directly send the request or the data to the first server, and instead, any server corresponding to respective target binding objects sends the request or the data that needs to be sent to an intermediate server, and the intermediate server sends the request or the data that needs to be sent to the first server. Following the above-mentioned example, server S6 is any server corresponding to the target binding object. When server S6 sends any request or any data to the first server, server S6 may not directly send the request or the data to the first server, and instead, server S6 sends the request or the data that needs to be sent to an intermediate server, and the intermediate server sends the request or the data that needs to be sent to the first server.

Regardless of whether the intermediate server receives the request and the data from the first server or any server corresponding to respective target binding objects, the intermediate server can perform identity authentication on the request or the data, and then send the request and the data to the first server or any server corresponding to respective target binding objects.

It is worthwhile to note that in the present embodiment, the trigger terminal device can be changed. For example, the user logs in to the first account on terminal device and initiates the account binding service, and then logs in to the first account on terminal device b to select a second account. In this case, the trigger terminal device is changed from terminal device a to terminal device b.

In the present embodiment, the candidate binding object can be diverse, and the user is given the right to choose; the first account represents one of the accounts that the user wants to bind; and the target binding object represents the object that the user wants to bind.

The first server sends the identity authentication request or the binding consulting request to the server corresponding to respective target binding objects, and obtains the authentication feedback data or the consultation feedback data sent by the server corresponding to respective target binding objects, thereby implementing authentication, matching or consensus of the user identity data corresponding to the first account between the first server and the server corresponding to respective target binding objects.

The account creation process enables the user to create and bind accounts at one single time for an object that the user wants to bind and that does not have an account.

By selecting a second account, the user can determine the second account that the user wants to bind, that is, the other one of the accounts that the user wants to bind. In addition, the user can select a plurality of second accounts, so as to complete the binding between the first account and the second account.

In the present embodiment, the user first selects the target binding object, and further determines the server corresponding to respective target binding objects among the servers corresponding to the candidate objects, and makes the server corresponding to respective target binding objects determine the second account on the server. Then, the user selects the second account, and further determines the target server among the servers corresponding to each of the respective target binding objects, thereby implementing the binding between the first account and the second account on each target server.

According to the present embodiment, one-to-many account binding can be implemented at one single time, that is, one first account is bound to a plurality of second accounts, thereby improving the efficiency of account binding. The user does not need to input personal identity data during binding, and the first server can automatically obtain the user identity data corresponding to the first account, further improving the efficiency of account binding and improving the security of account binding.

In the existing technology, to perform electronic payment and improve experience of the electronic payment, the user can bind a third-party payment account of the user to an account of a financial institution (including but not limited to a bank) to create an electronic payment service such as quick payment. To implement quick payment, the bank account of the user needs to be bound to an account of a third-party payment institution in advance under the framework of a tripartite agreement (among the user, the bank, and the payment institution).

As the quantity of third-party payment institutions increases, the user may need to bind the financial institution account (a bank account is used as an example in the following description) of the user to accounts of a plurality of third-party payment institutions. However, in the existing technology, the user has to initiate the binding of the bank account through a third-party payment institution, and each third-party payment institution can only bind its own account to the bank account. In addition, processes of binding various third-party payment institutions to the bank account are different. Consequently, the user needs to input the binding elements (including but not limited to a name, identity information, a bank card number, and a mobile phone number) in each binding process. The user is likely to fill in wrong information, resulting in a complicated binding process and low binding efficiency.

In the present embodiment, the bank server can be used as the first server, the bank account can be used as the first account, each third-party payment institution can be used as the candidate binding object, the server of each third-party payment institution can be used as the target server, and the account of the third-party payment institution can be used as the second account, so that one bank account can be bound to the accounts of a plurality of third-party institutions at one single time, effectively improving the efficiency of account binding. In the present embodiment, the account binding can be initiated from the bank, without relying on various third-party payment institutions. During the account binding, the user does not need to input personal information, and the bank can automatically obtain the first account and the user identity information corresponding to the first account, further improving the efficiency of account binding and the security of account binding.

It is worthwhile to note that in the process of binding the account of the financial institution to the account of the third-party payment institution, the above-mentioned intermediate server can be a server of NETPAY or UNIONPAY.

The first embodiment of the present specification is mainly described from the perspective of the first server, and the second embodiment of the present specification is mainly described from the perspective of the second server (further, from the perspective of the target server).

A second embodiment (hereinafter referred to as "the present embodiment") of the present specification provides a data processing method, and an execution body of the present embodiment can be a terminal device (including but not limited to a mobile phone, a computer, a pad, and a television), a server, an operating system, a data processing platform, a data processing system, etc., that is, the execution body can be diverse, and the execution body can be set, used, or transformed as needed. In addition, a third-party application can alternatively be provided to assist the execution body in executing the present embodiment. For example, as shown in FIG. 1, the data processing method in the present embodiment can be performed by a server, an application (corresponding to the server) can be installed on a terminal device (held by a user), data can be transmitted between the terminal device or the application and the server, and the terminal device or the application can be used to collect, input, or output data, or process a page or information (for the user), thereby assisting the server in performing the data processing method in the present embodiment.

Figure 11:
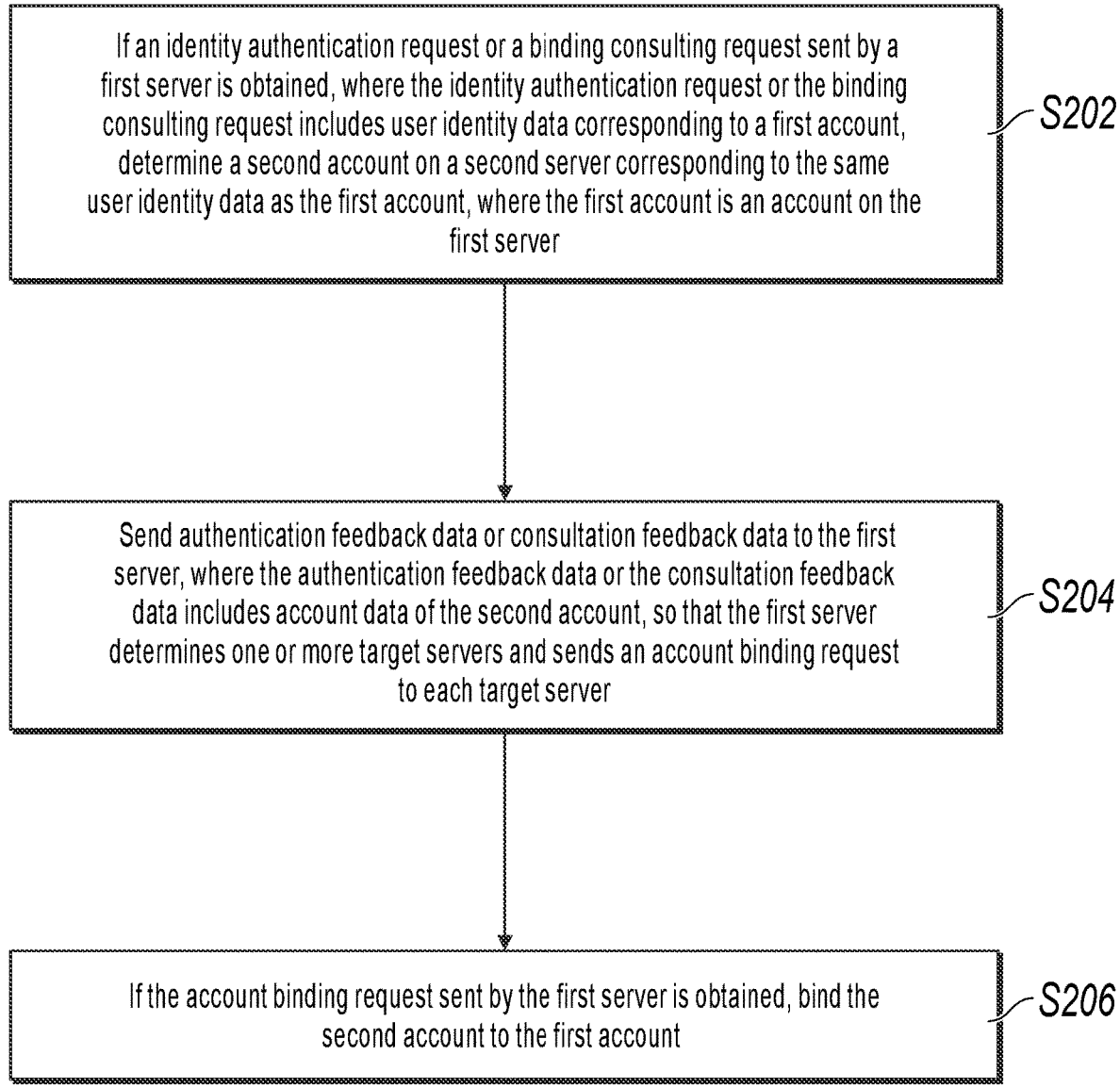
FIG. 11 is a schematic flowchart illustrating a data processing method, according to a second embodiment of the present specification.

As shown in FIG. 11, the data processing method provided in the present embodiment is applied to the second server (that is, the execution body is the second server), and includes the following:

S202: If an identity authentication request or a binding consulting request sent by a first server is obtained, where the identity authentication request or the binding consulting request includes user identity data corresponding to a first account, determine a second account on the second server corresponding to the same user identity data as the first account, where the first account is an account on the first server.

The second server in the present embodiment obtains the identity authentication request or the binding consulting request sent by the first server. This means that the second server in the present embodiment is a server corresponding to the target binding object in the first embodiment, that is, a server corresponding to the candidate binding object.

S204: Send authentication feedback data or consultation feedback data to the first server, where the authentication feedback data or the consultation feedback data includes account data of the second account, so that the first server determines one or more target servers and sends an account binding request to each target server.

In the present embodiment, the identity authentication request or the binding consulting request sent by the first server is obtained. If there is no account on the second server corresponding to the same user identity data as the first account, the authentication feedback data or the consultation feedback data is used to enable the first server to determine that there is no account on the second server corresponding to the same user identity data as the first account.

In the present embodiment, if an account creation request sent by the first server is received, the second account corresponding to the same user identity data as the first account is created based on the account creation request; and creation feedback data is sent to the first server, where the creation feedback data includes the account data of the second account that is created based on the account creation request.

In the present embodiment, if there are a plurality of second accounts, the authentication feedback data or the consultation feedback data further includes account data of a recommended account, and the recommended account is one or more second accounts.

In the present embodiment, the recommended account is determined based on historical account operation data of the plurality of second accounts.

S206: If the account binding request sent by the first server is obtained, bind the second account to the first account.

The account binding request here can be the account binding request in method 2.1 or 2.2. This means that the second server in the present embodiment has become a particular target server in the first embodiment.

In the present embodiment, if there are a plurality of second accounts, the binding the second account to the first account includes the following: determining a second to-be-bound account among the plurality of second accounts based on the account binding request, and binding the second to-be-bound account to the first account.

In the present embodiment, if there are a plurality of second accounts, the binding the second account to the first account includes the following: determining a second to-be-bound account among the plurality of second accounts, and binding the second to-be-bound account to the first account.

After binding the second account on the second server to the first account, the second server can send account binding request feedback data to the first server.

The account binding request feedback data here can be the account binding request feedback data in method 2.1, or the account binding request feedback data in method 2.2.

Referring to the first embodiment, in the present embodiment, if the second server needs to send any request or any data to the first server, the second server can send any request or any data to an intermediate server, and the intermediate server sends any request or any data to the first server.

For the content not described in detail in the present embodiment, references can be made to the first embodiment.

According to the present embodiment, one-to-many account binding can be implemented at one single time, that is, one first account is bound to a plurality of second accounts, thereby improving the efficiency of account binding. The user does not need to input personal identity data during binding, and the first server can automatically obtain the user identity data corresponding to the first account, further improving the efficiency of account binding and improving the security of account binding.

The present embodiment, such as the first embodiment, can be applied to the binding between an account of a financial institution and an account of a third-party payment institution.

As shown in the first embodiment, both the first account and the second account can be resource storage accounts or resource transfer accounts. After the first account is bound to the second account through the first or second embodiment, a resource can be transferred between the first account and each second account bound to the first account.

A third embodiment (hereinafter referred to as "the present embodiment") of the present specification provides a resource transfer method, and an execution body of the present embodiment can be a terminal device (including but not limited to a mobile phone, a computer, a pad, and a television), a server, an operating system, a resource transfer platform, a resource transfer system, etc., that is, the execution body can be diverse, and the execution body can be set, used, or transformed as needed. In addition, a third-party application can alternatively be provided to assist the execution body in executing the present embodiment. For example, as shown in FIG. 1, the resource transfer method in the present embodiment can be performed by a server, an application (corresponding to the server) can be installed on a terminal device (held by a user), data can be transmitted between the terminal device or the application and the server, and the terminal device or the application can be used to collect, input, or output data, or process a page or information (for the user), thereby assisting the server in performing the resource transfer method in the present embodiment.

Figure 12:
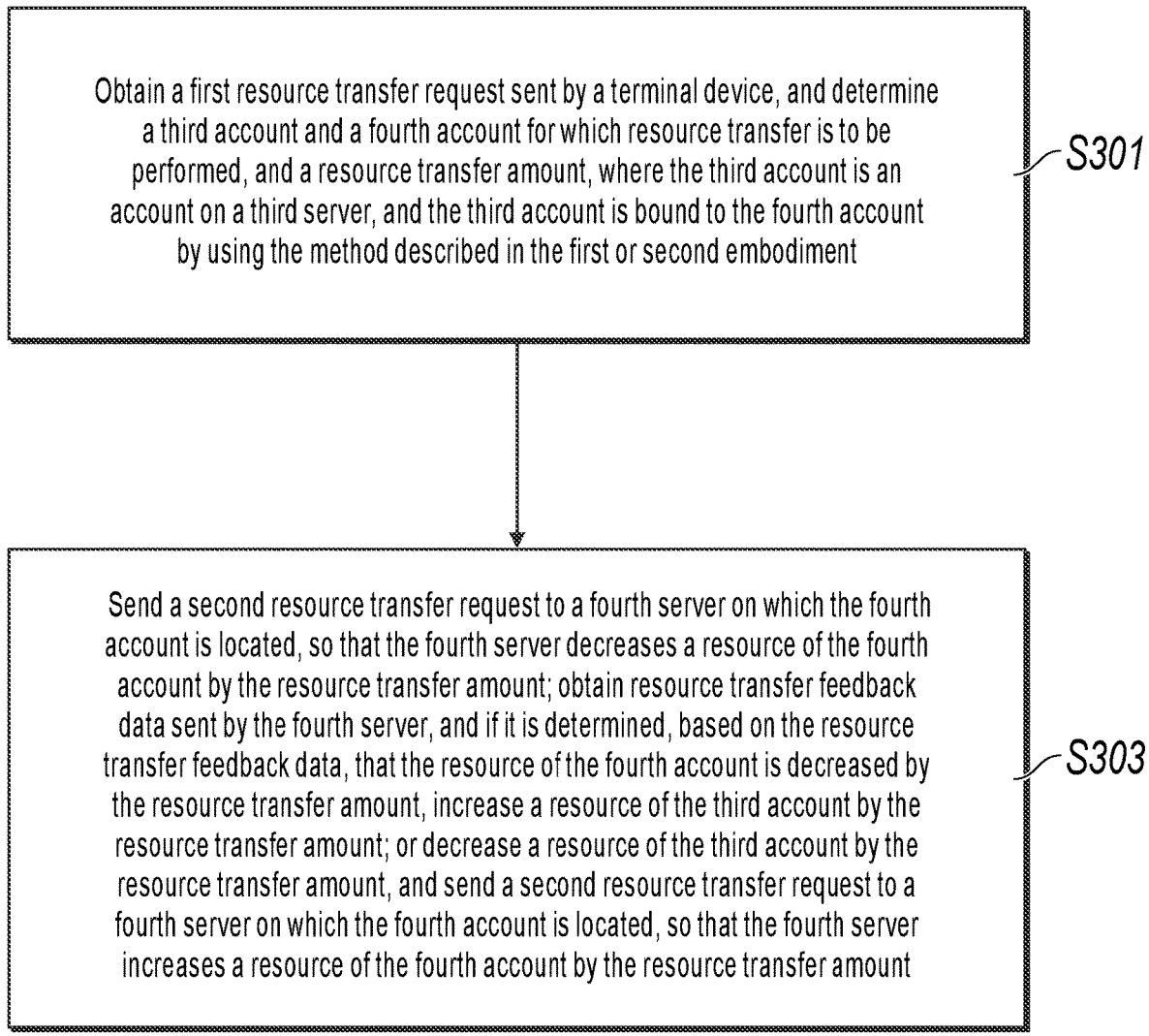
FIG. 12 is a schematic flowchart illustrating a resource transfer method, according to a third embodiment of the present specification.

As shown in FIG. 12, the resource transfer method provided in the present embodiment is applied to a third server (that is, the execution body is the third server), and includes the following:

S301: Obtain a first resource transfer request sent by a terminal device, and determine a third account and a fourth account for which resource transfer is to be performed, and a resource transfer amount, where the third account is an account on the third server, and the third account is bound to the fourth account by using the method described in the first or second embodiment.

The third server in the present embodiment is equivalent to the first server in the first embodiment or the second server (or the target server) in the second embodiment.

The third server can obtain the first resource transfer request sent by the terminal device (which can be referred to as a "second trigger terminal device", the trigger terminal device in the first embodiment is a first trigger terminal device, and the first trigger terminal device and the second trigger terminal device can be the same or different).

Referring to the first embodiment, the user can initiate the resource transfer service through the application corresponding to the third server, and then the second trigger terminal device sends the first resource transfer request to the third server.

The third account for which resource transfer is to be performed is an account on the third server, and the method for determining the third account is determined according to the method for determining the first account, for example, by user input or determined based on the login account of the second trigger terminal device. Both the first account and any second account bound to the first account can be used as resource outbound accounts or resource inbound accounts. Therefore, the third account can be equivalent to the first account or the second account.

The fourth account for which resource transfer is to be performed can be determined by the user and included in the first resource transfer request. Therefore, the third server can determine the fourth account based on the first resource transfer request. Similarly, both the first account and any second account bound to the first account can be used as resource outbound accounts or resource inbound accounts. Therefore, the third account can be equivalent to the first account or the second account.

The resource transfer amount can be included in the first resource transfer request, and therefore the third server can determine the resource transfer amount based on the first resource transfer request.

The third account is bound to the fourth account by using the method described in the first or second embodiment. If (the third server determines that) the third account has not been bound to the fourth account when the first resource transfer request is obtained, like the first server in the first embodiment, the third server can use the data processing method in the first embodiment to bind the third account to the fourth account.

S303: Send a second resource transfer request to a fourth server on which the fourth account is located, so that the fourth server decreases a resource of the fourth account by the resource transfer amount; obtain resource transfer feedback data sent by the fourth server, and if it is determined, based on the resource transfer feedback data, that the resource of the fourth account is decreased by the resource transfer amount, increase a resource of the third account by the resource transfer amount; or decrease a resource of the third account by the resource transfer amount, and send a second resource transfer request to a fourth server on which the fourth account is located, so that the fourth server increases a resource of the fourth account by the resource transfer amount.

The second resource transfer request can include account data of the fourth account and the resource transfer amount, so that after the fourth server on which the fourth account is located obtains the second resource transfer request, the fourth server determines a fourth account on the fourth server for which resource transfer is to be performed, and determines a resource transfer amount.

If the first resource transfer request is to transfer a resource from the fourth account to the third account, that is, the third server is a resource inbound server, the third server sends a second resource transfer request to a fourth server on which the fourth account is located, so that the fourth server decreases a resource of the fourth account by the resource transfer amount; the third server obtains resource transfer feedback data sent by the fourth server, and if it is determined, based on the resource transfer feedback data, that the resource of the fourth account is decreased by the resource transfer amount, increases a resource of the third account by the resource transfer amount.

If the first resource transfer request is to transfer a resource from the third account to the fourth account, that is, the third server is a resource outbound server, the third server decreases a resource of the third account by the resource transfer amount, and sends a second resource transfer request to a fourth server on which the fourth account is located, so that the fourth server increases a resource of the fourth account by the resource transfer amount.

The third server can send user feedback data to the second trigger terminal device, so that the second trigger terminal device displays the resource transfer result.

Referring to the first or second embodiment, the data transmission between the third server and the fourth server can be performed through an intermediate server.

In the present embodiment, the third account is bound to the fourth account by using the method in the first or second embodiment. This can implement one-to-many account binding at one single time and improve the efficiency of account binding. The resource transfer through the bound account further improves the efficiency of resource transfer.

A fourth embodiment (hereinafter referred to as "the present embodiment") of the present specification provides a resource transfer method, and an execution body of the present embodiment can be a terminal device (including but not limited to a mobile phone, a computer, a pad, and a television), a server, an operating system, a resource transfer platform, a resource transfer system, etc., that is, the execution body can be diverse, and the execution body can be set, used, or transformed as needed. In addition, a third-party application can alternatively be provided to assist the execution body in executing the present embodiment. For example, as shown in FIG. 1, the resource transfer method in the present embodiment can be performed by a server, an application (corresponding to the server) can be installed on a terminal device (held by a user), data can be transmitted between the terminal device or the application and the server, and the terminal device or the application can be used to collect, input, or output data, or process a page or information (for the user), thereby assisting the server in performing the resource transfer method in the present embodiment.

Figure 13:
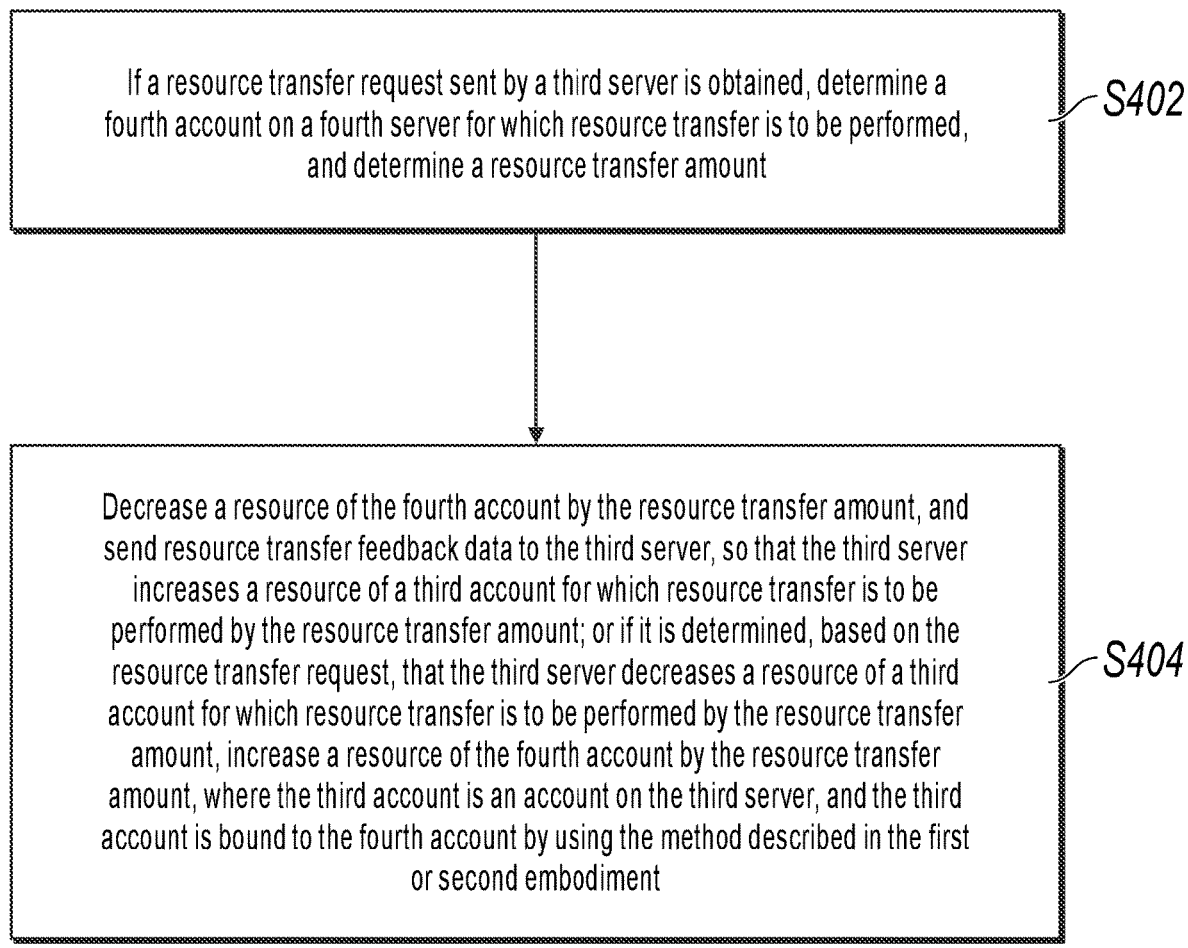
FIG. 13 is a schematic flowchart illustrating a resource transfer method, according to a fourth embodiment of the present specification.

As shown in FIG. 13, the resource transfer method provided in the present embodiment is applied to a fourth server (that is, the execution body is the fourth server), and includes the following:

S402: If a resource transfer request sent by a third server is obtained, determine a fourth account on the fourth server for which resource transfer is to be performed, and determine a resource transfer amount.

The third server in the present embodiment is equivalent to the first server in the first embodiment or the second server (or the target server) in the second embodiment, and the resource transfer request in the present embodiment is the second resource transfer request in the third embodiment.

S404: Decrease a resource of the fourth account by the resource transfer amount, and send resource transfer feedback data to the third server, so that the third server increases a resource of a third account for which resource transfer is to be performed by the resource transfer amount; or if it is determined, based on the resource transfer request, that the third server decreases a resource of a third account for which resource transfer is to be performed by the resource transfer amount, increase a resource of the fourth account by the resource transfer amount, where the third account is an account on the third server, and the third account is bound to the fourth account by using the method described in the first or second embodiment.

For the content not described in detail in the present embodiment, references can be made to the third embodiment.

In the present embodiment, the third account is bound to the fourth account by using the method in the first or second embodiment. This can implement one-to-many account binding at one single time and improve the efficiency of account binding. The resource transfer through the bound account further improves the efficiency of resource transfer.

The resource in the third or fourth embodiment includes a virtual resource, and the virtual resource includes funds. Therefore, the resource transfer in the third or fourth embodiment can be funds transfer, such as top-up from the third account to the fourth account or top-up from the fourth account to the third account, so the third or fourth embodiment can alternatively include a top-up method.

Payment can be used as a type of funds transfer, so the third or fourth embodiment can alternatively include a payment method.

A fifth embodiment (hereinafter referred to as "the present embodiment") of the present specification provides a payment method, and an execution body of the present embodiment can be a terminal device (including but not limited to a mobile phone, a computer, a pad, and a television), a server, an operating system, a payment platform, a payment system, etc., that is, the execution body can be diverse, and the execution body can be set, used, or transformed as needed. In addition, a third-party application can alternatively be provided to assist the execution body in executing the present embodiment. For example, as shown in FIG. 1, the payment method in the present embodiment can be performed by a server, an application (corresponding to the server) can be installed on a terminal device (held by a user), data can be transmitted between the terminal device or the application and the server, and the terminal device or the application can be used to collect, input, or output data, or process a page or information (for the user), thereby assisting the server in performing the payment method in the present embodiment.

Figure 14:
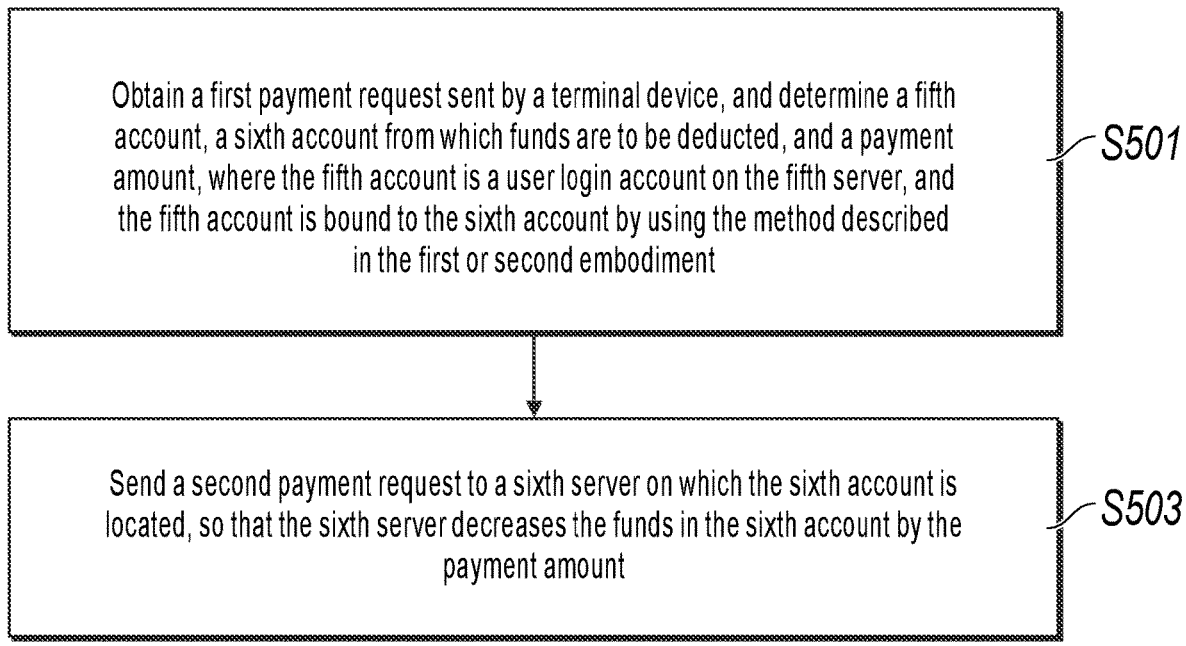
FIG. 14 is a schematic flowchart illustrating a payment method, according to a fifth embodiment of the present specification.

As shown in FIG. 14, the payment method provided in the present embodiment is applied to a fifth server (that is, the execution body is the fifth server), and includes the following:

S501: Obtain a first payment request sent by a terminal device, and determine a fifth account, a sixth account from which funds are to be deducted, and a payment amount, where the fifth account is a user login account on the fifth server, and the fifth account is bound to the sixth account by using the method described in the first or second embodiment.

The fifth server in the present embodiment is equivalent to any one of the first to fourth servers, or can be the target server in the second embodiment.

The fifth server can obtain the first payment request sent by the terminal device (which can be referred to as a "third trigger terminal device"; the first, second, and third trigger terminal devices can be the same or different).

Referring to the first embodiment, the user can initiate the resource transfer service through the application corresponding to the fifth server, and then the third trigger terminal device sends the first payment request to the fifth server.

The fifth account is an account on the fifth server, and the method for determining the fifth account is determined according to the method for determining the first account, for example, by user input or determined based on the login account of the third trigger terminal device. Although the fifth server obtains the first payment request, the fifth account may not be a funds deduction account. For example, in a quick payment scenario, the server of the third-party payment institution obtains the first payment request sent by the user terminal device, but the funds deduction account can be a financial institution account bound to the account of the third-party payment institution.

The sixth account from which funds are to be deducted can be determined by the user and be included in the first payment request, so the fifth server can determine the sixth account based on the first payment request.

The payment amount can be included in the first payment request, so the fifth server can determine the payment amount based on the first payment request.

The fifth account is bound to the sixth account by using the method described in the first or second embodiment. If (the fifth server determines that) the fifth account has not been bound to the sixth account when the first payment request is obtained, like the first server in the first embodiment, the fifth server can use the data processing method in the first embodiment to bind the fifth account to the sixth account.

S503: Send a second payment request to a sixth server on which the sixth account is located, so that the sixth server decreases the funds in the sixth account by the payment amount.

The second payment request can include account data of the sixth account and the payment amount, so that after the sixth server on which the sixth account is located obtains the second payment request, the sixth server determines the sixth account for which payment is to be performed on the sixth server, and determines the payment amount.

After decreasing the funds in the sixth account by the payment amount, the sixth server can send payment feedback data to the fifth server. If the fifth server determines, based on the payment feedback data sent by the sixth server, that the payment amount has been deducted from the sixth account, the fifth server can send the user feedback data to the third trigger terminal device so that the third trigger terminal device displays the payment result.

If the fifth server is the funds receiving server corresponding to the payment, the fifth server can increase the funds in the funds receiving account on the fifth server by the payment amount after determining, based on the payment feedback data sent by the sixth server, that the payment amount has been deducted from the sixth account.

If the fifth server is not the funds receiving server corresponding to the payment, the fifth server can send a funds receiving instruction to the funds receiving server after the fifth server determines, based on the payment feedback data sent by the sixth server, that the payment amount has been deducted from the sixth account, so that the funds receiving server adds the payment amount to the funds receiving account on the funds receiving server.

The fifth server can be a server of a third-party payment institution, the sixth server can be a server of a financial institution, the fifth account can be a third-party payment institution account of the payer, the sixth account can be a financial institution account of the payer, and the funds receiving account can be a third-party payment institution account of the payee.

Referring to the first or second embodiment, the data transmission between the fifth server and the sixth server, and between the fifth server and the funds receiving server can be performed through an intermediate server. The intermediate server includes but is not limited to a NETPAY or UNIONPAY server or a server of a payment regulatory authority.

In the present embodiment, the third account is bound to the fourth account by using the method in the first or second embodiment. This can implement one-to-many account binding at one single time and improve the efficiency of account binding. Payment through the bound account further improves the payment efficiency.

A sixth embodiment (hereinafter referred to as "the present embodiment") of the present specification provides a payment method, and an execution body of the present embodiment can be a terminal device (including but not limited to a mobile phone, a computer, a pad, and a television), a server, an operating system, a payment platform, a payment system, etc., that is, the execution body can be diverse, and the execution body can be set, used, or transformed as needed. In addition, a third-party application can alternatively be provided to assist the execution body in executing the present embodiment. For example, as shown in FIG. 1, the payment method in the present embodiment can be performed by a server, an application (corresponding to the server) can be installed on a terminal device (held by a user), data can be transmitted between the terminal device or the application and the server, and the terminal device or the application can be used to collect, input, or output data, or process a page or information (for the user), thereby assisting the server in performing the payment method in the present embodiment.

Figure 15:
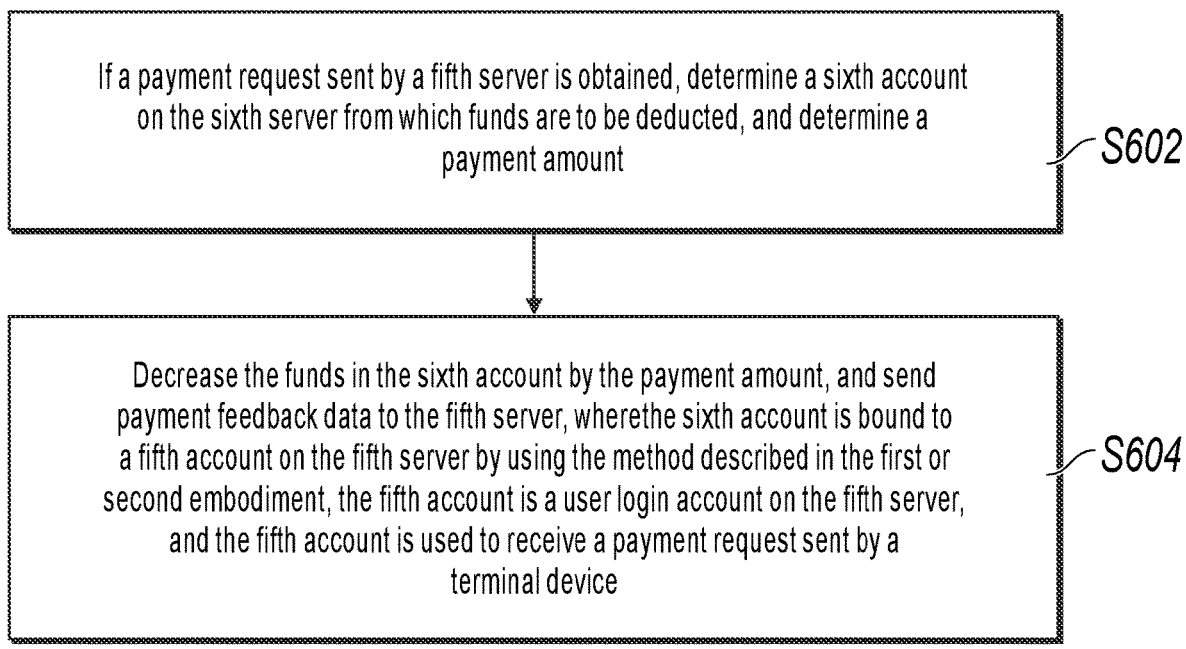
FIG. 15 is a schematic flowchart illustrating a payment method, according to a sixth embodiment of the present specification.

As shown in FIG. 15, the payment method provided in the present embodiment is applied to a sixth server (that is, the execution body is the sixth server), and includes the following:

S602: If a payment request sent by a fifth server is obtained, determine a sixth account on the sixth server from which funds are to be deducted, and determine a payment amount.

The sixth server in the present embodiment is equivalent to any one of the first to fourth servers, or can be the target server in the second embodiment. The payment request in the present embodiment is the second payment request in the fourth embodiment.

S604: Decrease the funds in the sixth account by the payment amount, and send payment feedback data to the fifth server, where the sixth account is bound to a fifth account on the fifth server by using the method described in the first or second embodiment, the fifth account is a user login account on the fifth server, and the fifth account is used to receive a payment request sent by a terminal device.

For the content not described in detail in the present embodiment, references can be made to the fourth embodiment.

In the present embodiment, the third account is bound to the fourth account by using the method in the first or second embodiment. This can implement one-to-many account binding at one single time and improve the efficiency of account binding. Payment through the bound account further improves the payment efficiency.

It is worthwhile to note that the first and second servers in the first or second embodiment can be located in different countries or regions (the intermediate server can be located in the same country or region as the first or second server, or the intermediate server and the first or second server can be located in different countries or regions), so as to implement (one-to-many) account binding between different countries or regions. Likewise, the third and fourth servers (and the intermediate server) in the third or fourth embodiment, or the fifth and sixth servers (and the intermediate server) in the fifth or sixth embodiment can also be located in different countries or regions, so as to implement the resource transfer or payment between different countries or regions.

Figure 16:
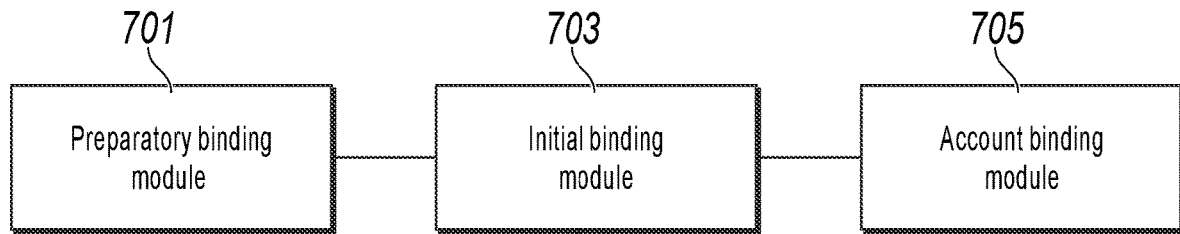
FIG. 16 is a schematic structural diagram illustrating a data processing apparatus, according to a seventh embodiment of the present specification.

As shown in FIG. 16, a seventh embodiment of the present specification provides a data processing apparatus, including the following: a preparatory binding module 701, configured to obtain a user binding request sent by a terminal device, determine a first to-be-bound account on the apparatus, and send user binding request feedback data to the terminal device so that the terminal device displays candidate binding objects; an initial binding module 703, configured to obtain binding object selection data sent by the terminal device, determine respective target binding objects based on the binding object selection data, and determine one or more target servers among servers corresponding to each of the respective target binding objects; and an account binding module 705, configured to: bind the first account to a second account on each target server, and send an account binding request to each target server so that the target server binds the second account on the target server to the first account, where the second account corresponds to the same user identity data as the first account.

Optionally, the apparatus further includes a first server, and the first account is an account on the first server.

Optionally, the preparatory binding module 701 is further configured to: before sending an account binding request to each target server, send an identity authentication request or a binding consulting request to the server corresponding to respective target binding objects, where the identity authentication request or the binding consulting request includes the user identity data corresponding to the first account, so that any server corresponding to respective target binding objects determines a second account on the server corresponding to the same user identity data as the first account.

Optionally, the preparatory binding module 701 is further configured to: after sending the identity authentication request or the binding consulting request to any server corresponding to respective target binding objects, obtain authentication feedback data or consultation feedback data sent by any server corresponding to respective target binding objects, and determine the second account on the server based on the authentication feedback data or the consultation feedback data sent by the server.

Optionally, the preparatory binding module 701 is further configured to: after determining the second account on any server corresponding to respective target binding objects based on the authentication feedback data or the consultation feedback data sent by the server, and before determining one or more target servers, send candidate account data to the terminal device, where the candidate account data is used to enable the terminal device to display the second account that is determined by the server corresponding to respective target binding objects.

Optionally, the preparatory binding module 701 is further configured to: after the sending an identity authentication request or a binding consulting request to any server corresponding to respective target binding objects, obtain the authentication feedback data or the consultation feedback data sent by any server corresponding to respective target binding objects, where if it is determined that the second account does not exist on a server corresponding to the target binding object, the candidate account data is further used to enable the terminal device to display first prompt information, and the first prompt information is used to prompt that there is no account that can be bound to the target binding object corresponding to the server on which the second account does not exist.

Optionally, the preparatory binding module 701 is further configured to: after the sending an identity authentication request or a binding consulting request to any server corresponding to respective target binding objects, obtain the authentication feedback data or the consultation feedback data sent by any server corresponding to respective target binding objects, where if it is determined that the second account does not exist on a server corresponding to the target binding object, the candidate account data is further used to enable the terminal device to display second prompt information, and the second prompt information is further used to prompt a user to create an account for the target binding object corresponding to the server on which the second account does not exist.

Optionally, the preparatory binding module 701 is further configured to: after the sending candidate account data to the terminal device, obtain a user creation request sent by the terminal device, and determine one or more account creation servers based on the user creation request; and send an account creation request to each account creation server, so that each account creation server creates a second account corresponding to the same user identity data as the first account.

Optionally, the preparatory binding module 701 is further configured to: after the sending an account creation request to each account creation server, obtain creation feedback data sent by any account creation server, and determine the second account created by the account creation server based on the creation feedback data; and send supplemental candidate account data to the terminal device, where the supplemental candidate account data is used to enable the terminal device to display the second account created by each account creation server.

Optionally, the preparatory binding module 701 is further configured to: after the obtaining authentication feedback data or consultation feedback data sent by any server corresponding to respective target binding objects, determine the second account on the server based on the authentication feedback data or the consultation feedback data sent by the server.

Optionally, the candidate account data is further used to enable the terminal device to display first recommendation information, and the first recommendation information is used to prompt the second account recommended to be bound.

Optionally, the preparatory binding module 701 is further configured to: after determining the second account on any server corresponding to respective target binding objects based on the authentication feedback data or the consultation feedback data sent by the server, determine the second account recommended to be bound among the second accounts of the server corresponding to respective target binding objects.

The candidate account data is further used to enable the terminal device to display second recommendation information, and the second recommendation information is used to prompt the second account recommended to be bound.

Optionally, the determining the second account recommended to be bound among second accounts of the servers corresponding to each of the respective target binding objects includes the following: determining the second account recommended to be bound among the second accounts of the servers corresponding to each of the respective target binding objects, based on historical interaction data between the first server and the server corresponding to respective target binding objects.

Optionally, for any target server, if there are a plurality of second accounts on the target server, the sending an account binding request to each target server so that the target server binds the second account on the target server to the first account includes the following: sending the account binding request to each target server so that the target server binds one second account on the target server to the first account.

Optionally, the determining one or more target servers among servers corresponding to each of the respective target binding objects includes the following: obtaining binding account selection data sent by the terminal device, determining one or more selected second accounts based on the binding account selection data, and using a server on which the one or more selected second accounts are located as the target server.

Optionally, the binding the first account to a second account on each target server, and sending an account binding request to each target server so that the target server binds the second account on the target server to the first account includes the following: sending the account binding request to each target server so that the target server binds the second account on the target server to the first account; obtaining account binding request feedback data sent by any target server, and if it is determined, based on the account binding request feedback data, that the target server has bound the second account on the target server to the first account, binding the first account to the second account on the target server; or after binding the first account to the second account on any target server, sending the account binding request to the target server so that the target server binds the second account on the target server to the first account.

Optionally, the apparatus further includes the following: a sending module, configured to send user feedback data to the terminal device so that the terminal device displays an account binding result.

Optionally, the first account is a login account of the terminal device when the account binding request is obtained; or the first account is determined based on the account binding request.

Optionally, the account binding request includes user identity data corresponding to the first account.

Optionally, the first account or the second account is a resource storage account or a resource transfer account.

Optionally, if the first server sends any request or any data to any server corresponding to respective target binding objects, the first server sends any request or any data to an intermediate server, and the intermediate server sends any request or any data to any server corresponding to respective target binding objects.

Figure 17:
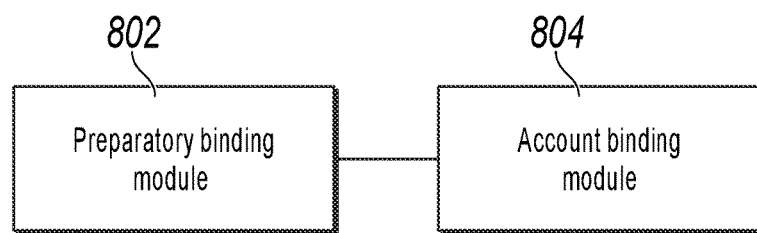
FIG. 17 is a schematic structural diagram illustrating a data processing apparatus, according to an eighth embodiment of the present specification.

As shown in FIG. 17, an eighth embodiment of the present specification provides a data processing apparatus, including the following: a preparatory binding module 802, configured to: if an identity authentication request or a binding consulting request sent by a first server is obtained, where the identity authentication request or the binding consulting request includes user identity data corresponding to a first account, determine a second account on the apparatus corresponding to the same user identity data as the first account, where the first account is an account on the first server; and send authentication feedback data or consultation feedback data to the first server, where the authentication feedback data or the consultation feedback data includes account data of the second account, so that the first server determines one or more target servers and sends an account binding request to each target server; and an account binding module 804, configured to: if the account binding request sent by the first server is obtained, bind the second account to the first account.

Optionally, the apparatus further includes a second server, and the second account is an account on the second server.

Optionally, after the identity authentication request or the binding consulting request sent by the first server is obtained, if the preparatory binding module 802 determines that there is no account on the second server corresponding to the same user identity data as the first account, the authentication feedback data or the consultation feedback data is used to enable the first server to determine that there is no account on the second server corresponding to the same user identity data as the first account.

Optionally, the preparatory binding module 802 is further configured to: if an account creation request sent by the first server is received, the second account corresponding to the same user identity data as the first account is created based on the account creation request; and creation feedback data is sent to the first server, where the creation feedback data includes the account data of the second account that is created based on the account creation request.

Optionally, after the identity authentication request or the binding consulting request sent by the first server is obtained, if the preparatory binding module 802 determines that there are a plurality of second accounts, the authentication feedback data or the consultation feedback data further includes account data of a recommended account, and the recommended account is one or more second accounts.

Optionally, the preparatory binding module 802 is further configured to determine the recommended account based on historical account operation data of the plurality of second accounts.

Optionally, if there are a plurality of second accounts, the binding the second account to the first account includes the following: determining a second to-be-bound account among the plurality of second accounts based on the account binding request, and binding the second to-be-bound account to the first account.

Optionally, if there are a plurality of second accounts, the binding the second account to the first account includes the following: determining a second to-be-bound account among the plurality of second accounts, and binding the second to-be-bound account to the first account.

Optionally, the apparatus further includes the following: a sending module, configured to send account binding request feedback data to the first server after binding the second account to the first account.

Optionally, if the second server sends any request or any data to the first server, the second server sends any request or any data to an intermediate server, and the intermediate server sends any request or any data to the first server.

Figure 18:
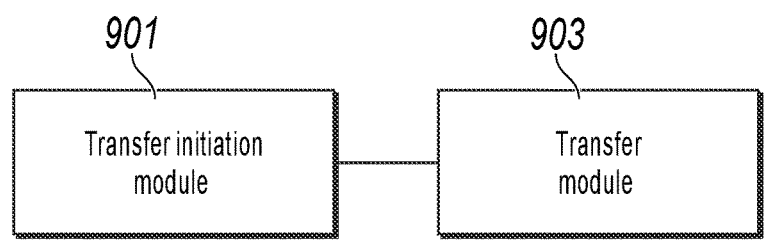
FIG. 18 is a schematic structural diagram illustrating a resource transfer apparatus, according to a ninth embodiment of the present specification.

As shown in FIG. 18, a ninth embodiment of the present specification provides a resource transfer apparatus, including the following: a transfer initiation module 901, configured to obtain a first resource transfer request sent by a terminal device, and determine a third account and a fourth account for which resource transfer is to be performed, and a resource transfer amount, where the third account is an account on the apparatus, and the third account is bound to the fourth account by using the method described in the first or second embodiment; and a transfer module 903, configured to send a second resource transfer request to a fourth server on which the fourth account is located, so that the fourth server decreases a resource of the fourth account by the resource transfer amount; obtain resource transfer feedback data sent by the fourth server, and if it is determined, based on the resource transfer feedback data, that the resource of the fourth account is decreased by the resource transfer amount, increase a resource of the third account by the resource transfer amount; or decrease a resource of the third account by the resource transfer amount, and send a second resource transfer request to a fourth server on which the fourth account is located, so that the fourth server increases a resource of the fourth account by the resource transfer amount.

Optionally, the apparatus further includes a third server, and the third account is an account on the third server.

Figure 19:
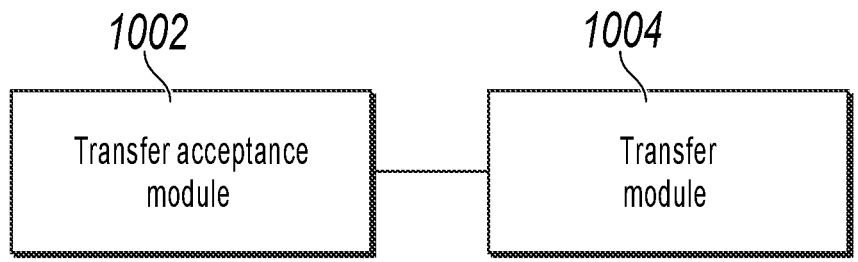
FIG. 19 is a schematic structural diagram illustrating a resource transfer apparatus, according to a tenth embodiment of the present specification.

As shown in FIG. 19, a tenth embodiment of the present specification provides a resource transfer apparatus, including the following: a transfer acceptance module 1002, configured to: if a resource transfer request sent by a third server is obtained, determine a fourth account on the apparatus for which resource transfer is to be performed, and determine a resource transfer amount; and a transfer module 1004, configured to decrease a resource of the fourth account by the resource transfer amount, and send resource transfer feedback data to the third server, so that the third server increases a resource of a third account for which resource transfer is to be performed by the resource transfer amount; or if it is determined, based on the resource transfer request, that the third server decreases a resource of a third account for which resource transfer is to be performed by the resource transfer amount, increase a resource of the fourth account by the resource transfer amount, where the third account is an account on the third server, and the third account is bound to the fourth account by using the method described in the first or second embodiment.

Optionally, the apparatus further includes a fourth server, and the fourth account is an account on the fourth server.

Figure 20:
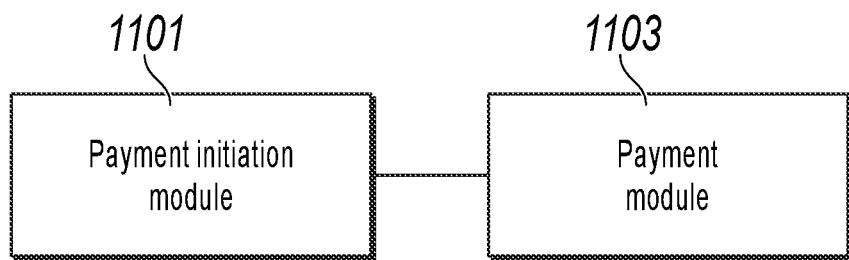
FIG. 20 is a schematic structural diagram illustrating a payment apparatus, according to an eleventh embodiment of the present specification.

As shown in FIG. 20, an eleventh embodiment of the present specification provides a payment apparatus, including the following: a payment initiation module 1101, configured to obtain a first payment request sent by a terminal device, and determine a fifth account, a sixth account from which funds are to be deducted, and a payment amount, where the fifth account is a user login account on the apparatus, and the fifth account is bound to the sixth account by using the method described in the first or second embodiment; and a payment module 1103, configured to send a second payment request to a sixth server on which the sixth account is located, so that the sixth server decreases the funds in the sixth account by the payment amount.

Optionally, the apparatus further includes a fifth server, and the fifth account is an account on the fifth server.

Figure 21:
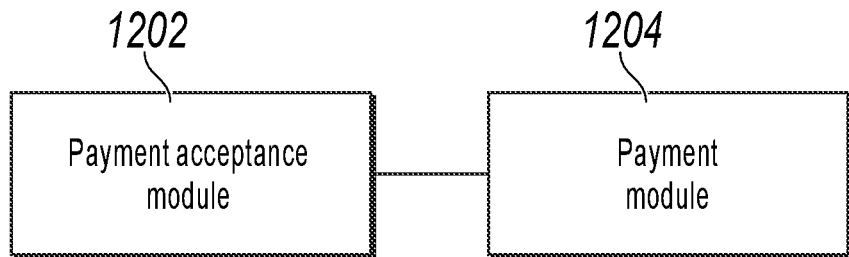
FIG. 21 is a schematic structural diagram illustrating a payment apparatus, according to a twelfth embodiment of the present specification.

As shown in FIG. 21, a twelfth embodiment of the present specification provides a payment apparatus, including the following: a payment acceptance module 1202, configured to: if a payment request sent by a fifth server is obtained, determine a sixth account on the apparatus from which funds are to be deducted, and determine a payment amount; and a payment module 1204, configured to decrease the funds in the sixth account by the payment amount, and send payment feedback data to the fifth server, where the sixth account is bound to a fifth account on the fifth server by using the method described in the first or second embodiment, the fifth account is a user login account on the fifth server, and the fifth account is used to receive a payment request sent by a terminal device.

Optionally, the apparatus further includes a sixth server, and the sixth account is an account on the sixth server.

It is worthwhile to note that the apparatus in the seventh or eighth embodiment can be located in different countries or regions (the intermediate server can be located in the same country or region as the apparatus in the seventh or eighth embodiment, or the intermediate server and the apparatus in the seventh or eighth embodiment can be located in different countries or regions), so as to implement (one-to-many) account binding between different countries or regions. Likewise, the apparatus (and the intermediate server) in the ninth or tenth embodiment, or the apparatus (and the intermediate server) in the eleventh or twelfth embodiment can also be located in different countries or regions, so as to implement the resource transfer or payment between different countries or regions.

A thirteenth embodiment of the present specification provides a data processing device, including the following: at least one processor; and a memory communicatively connected to the at least one processor, where the memory stores an instruction that can be executed by the at least one processor, and the instruction is executed by the at least one processor to enable the at least one processor to perform the data processing method described in the first or second embodiment.

A fourteenth embodiment of the present specification provides a resource transfer device, including the following: at least one processor; and a memory communicatively connected to the at least one processor, where the memory stores an instruction that can be executed by the at least one processor, and the instruction is executed by the at least one processor to enable the at least one processor to perform the resource transfer method described in the third or fourth embodiment.

A fifteenth embodiment of the present specification provides a payment device, including the following: at least one processor; and a memory communicatively connected to the at least one processor, where the memory stores an instruction that can be executed by the at least one processor, and the instruction is executed by the at least one processor to enable the at least one processor to perform the payment method described in the fifth or sixth embodiment.

A sixteenth embodiment of the present specification provides a computer-readable storage medium, where the computer-readable storage medium stores a computer-executable instruction, and the computer-executable instruction is executed by a processor to implement the data processing method described in the first or second embodiment.

A seventeenth embodiment of the present specification provides a computer-readable storage medium, where the computer-readable storage medium stores a computer-executable instruction, and the computer-executable instruction is executed by a processor to implement the resource transfer method described in the third or fourth embodiment.

An eighteenth embodiment of the present specification provides a computer-readable storage medium, where the computer-readable storage medium stores a computer-executable instruction, and the computer-executable instruction is executed by a processor to implement the payment method described in the fifth or sixth embodiment.

It is worthwhile to note that the data processing device for implementing the first embodiment and the data processing device for implementing the second embodiment can be located in different countries or regions, so as to implement (one-to-many) account binding between different countries or regions. Likewise, the resource transfer device for implementing the third embodiment, the resource transfer device for implementing the fourth embodiment, the payment device for implementing the fifth embodiment, and the payment device for implementing the sixth embodiment can be located in different countries or regions, so as to implement the resource transfer or payment between different countries or regions.

It is worthwhile to note that the computer-readable storage medium for implementing the first embodiment and the computer-readable storage medium for implementing the second embodiment can be located in different countries or regions, so as to implement (one-to-many) account binding between different countries or regions. Likewise, the computer-readable storage medium for implementing the third embodiment, the computer-readable storage medium for implementing the fourth embodiment, the computer-readable storage medium for implementing the fifth embodiment, and the computer-readable storage medium for implementing the sixth embodiment can be located in different countries or regions, so as to implement the resource transfer or payment between different countries or regions.

The above-mentioned embodiments can be used in combination, and modules having the same name can be the same or different between different embodiments or within the same embodiment.

The specific embodiments of the present specification have been described above, and other embodiments fall within the scope of the appended claims. In some situations, the actions or steps described in the claims can be performed in an order different from the order in the embodiments and the desired results can still be achieved. In addition, the processes described in the drawings do not necessarily require a specific order or sequential order shown in order to achieve the desired results. In some implementations, multitasking and parallel processing are also possible or may be advantageous.

The embodiments of the present specification are described in a progressive way. For same or similar parts of the embodiments, mutual references can be made to the embodiments. Each embodiment focuses on a difference from the other embodiments. In particular, the apparatus, device, and non-volatile computer-readable storage medium embodiments are briefly described because they substantially correspond to the method embodiments. For related parts, references can be made to the descriptions of the method embodiments.

The apparatus, the device, and the non-volatile computer-readable storage medium provided in the embodiments of the present specification correspond to the method. Therefore, the apparatus, the device, and the non-volatile computer storage medium also have similar advantageous technical effects to the corresponding method. Because the advantageous technical effects of the method have been described in detail above, descriptions for the advantageous technical effects of the corresponding apparatus, device, and non-volatile computer storage medium are omitted here for simplicity.

In the 1990s, whether technology improvement is hardware improvement (for example, improvement of a circuit structure, such as a diode, a transistor, or a switch) or software improvement (improvement of a method procedure) can be clearly distinguished. However, as technologies develop, current improvements of many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Alternatively, the apparatus configured to implement various functions can even be considered as both a software module implementing the method and a structure in the hardware component.

The system, apparatus, module, or unit illustrated in the above-mentioned embodiments can be specifically implemented by using a computer chip or an entity, or can be implemented by using a product having a certain function. A typical implementation device is a computer. Specifically, for example, the computer can be a personal computer, a laptop computer, a cellular phone, a camera phone, a smart phone, a personal digital assistant, a media player, a navigation device, an e-mail device, a game console, a tablet computer, a wearable device, or any combination of these devices.

For ease of description, the above-mentioned apparatus is described by dividing functions into various units. Certainly, functions of the units can be implemented in one or more pieces of software and/or hardware when the present specification is implemented.

A person skilled in the art should understand that the embodiments of the present specification can be provided as methods, systems, or computer program products. Therefore, the embodiments of the present specification can use a form of hardware only embodiments, software only embodiments, or embodiments with a combination of software and hardware. Moreover, the embodiments of the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the embodiments of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form that are in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of the computer storage medium include but are not limited to a phase change random access memory (PRAM), a static RAM (SRAM), a dynamic RAM (DRAM), a RAM of another type, a ROM, an electrically erasable programmable ROM (EEPROM), a flash memory or another memory technology, a CD-ROM, a digital versatile disc (DVD), or another optical storage, a cassette, a magnetic disk storage, or another magnetic storage device or any other non-transmission medium. The computer storage medium can be configured to store information that can be accessed by a computing device. Based on the definition in the present specification, the computer-readable medium does not include transitory media such as a modulated data signal and carrier.

It is worthwhile to further note that, the terms "include", "comprise", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present specification can be described in the general context of computer-executable instructions executed by a computer, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

The embodiments of the present specification are described in a progressive way. For same or similar parts of the embodiments, mutual references can be made to the embodiments. Each embodiment focuses on a difference from the other embodiments. Particularly, the system embodiments are briefly described because they substantially correspond to the method embodiments. For related parts, references can be made to related descriptions in the method embodiments.

The above-mentioned descriptions are merely embodiments of the present specification, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
obtaining a binding request sent by a terminal device;
in response to obtaining the binding request, (i) determining a first account, and (ii) sending binding request feedback data to the terminal device, wherein the binding request feedback data comprises candidate binding objects for presentation by the terminal device;
obtaining binding object selection data sent by the terminal device, wherein the binding object selection data indicates a selection of one or more of the candidate binding objects presented by the terminal device;
in response to obtaining the binding object selection data, (i) determining, for each selected candidate binding object, a respective target binding object, based on the binding object selection data, and (ii) determining, for each respective target binding object, a respective target server; and
for each respective target server, (i) binding the first account to a respective second account of the respective target server, wherein the respective second account corresponds to a same user identity as the first account, and (ii) sending an account binding request to the respective target server, so that the respective target server binds the respective second account of the respective target server to the first account.

2. The computer-implemented method of claim 1, further comprising:
before sending the account binding request to the respective target server, sending an identity authentication request or a binding consulting request to the respective target server, wherein the identity authentication request or the binding consulting request comprises user identity data corresponding to the first account, for determination of the respective second account of the respective target server that corresponds to the same user identity as the first account.

3. The computer-implemented method of claim 2, further comprising:
after sending the identity authentication request or the binding consulting request to the respective target server, (i) obtaining authentication feedback data or consultation feedback data sent by the respective target server, and (ii) determining the respective second account of the respective target server based on the authentication feedback data or the consultation feedback data sent by the respective target server.

4. The computer-implemented method of claim 3, further comprising:
after determining the respective second account of the respective target server, sending candidate account data to the terminal device, wherein the candidate account data comprises data associated with the respective second account for presentation by the terminal device.

5. The computer-implemented method of claim 4, further comprising:
after sending the identity authentication request or the binding consulting request to the respective target server, obtaining the authentication feedback data or the consultation feedback data sent by the respective target server, wherein when the respective second account does not exist on the respective target server, the candidate account data comprises first prompt information for presentation by the terminal device that indicates that there is no account of the respective target server that can be bound to the respective target binding object.

6. The computer-implemented method of claim 4, further comprising:
after sending the identity authentication request or the binding consulting request to the respective target server, obtaining the authentication feedback data or the consultation feedback data sent by the respective target server, wherein when the respective second account does not exist the respective target server, the candidate account data comprises second prompt information for presentation by the terminal device, to prompt a user to create an account of the respective target server for the respective target binding object.

7. The computer-implemented method of claim 6, further comprising:
after sending the candidate account data to the terminal device:
obtaining a user creation request sent by the terminal device;
determining one or more account creation servers based on the user creation request; and
sending an account creation request to each of the one or more account creation servers, so that each account creation server creates a new second account corresponding to the same user identity as the first account.

8. The computer-implemented method of claim 7, further comprising:
after sending the account creation request to each of the one or more account creations servers:
obtaining creation feedback data sent by at least one account creation server of the one or more account creation servers;
determining the new second account created by the at least one account creation server, based on the creation feedback data; and
sending supplemental candidate account data for presentation by the terminal device, wherein the supplemental candidate account data indicates the new second account created by the at least one account creation server.

9. The computer-implemented method of claim 3, further comprising:
after obtaining the authentication feedback data or consultation feedback data sent by the respective target server, determining that the respective second account of the respective target server is recommended to be bound, based on the authentication feedback data or the consultation feedback data.

10. The computer-implemented method of claim 4, wherein the candidate account data comprises recommendation information for presentation by the terminal device, wherein the recommendation information indicates that the respective second account is recommended to be bound.

11. The computer-implemented method of claim 4, further comprising:
after determining the respective second account of the respective target server based on the authentication feedback data or the consultation feedback data, determining that the respective second account of the respective target server is recommended to be bound among other second accounts of other target servers, wherein the candidate account data comprises second recommendation information for presentation by the terminal device, wherein the second recommendation information indicates that the respective second account is recommended to be bound.

12. The computer-implemented method of claim 11, wherein determining that the respective second account of the respective target server is recommended to be bound among other second accounts of other target servers is based on historical interaction data that indicates interactions with the respective target server.

13. The computer-implemented method of claim 1, wherein for the respective target server, when a plurality of second accounts exist on the respective target server, sending the account binding request to the respective target server comprises indicating that the respective target server is to bind only one second account of the respective target server to the first account.

14. The computer-implemented method of claim 4, wherein determining, for each respective binding object, the respective target server comprises:
(i) obtaining binding account selection data sent by the terminal device, and (ii) determining one or more selected second accounts based on the binding account selection data, wherein the respective target server is a server on which the one or more selected second accounts are located.

15. The computer-implemented method of claim 1, wherein the method comprises:
(i) sending the account binding request to the respective target server so that the respective target server binds the respective second account of the respective target server to the first account, (ii) after sending the account binding request, obtaining account binding request feedback data sent by the respective target server, and (iii) in response to determining, based on the account binding request feedback data, that the respective target server has bound the respective second account of the respective target server to the first account, binding the first account to the respective second account of the respective target server; or
after binding the first account to the respective second account of the respective target server, sending the account binding request to the respective target server.

16. The computer-implemented method of claim 1, further comprising:
sending user feedback data to the terminal device for presentation by the terminal device as an account binding result.

17. The computer-implemented method of claim 1, wherein the first account is a login account of the terminal device when the binding request is obtained, or the first account is determined based on the binding request.

18. The computer-implemented method of claim 1, wherein the binding request comprises user identity data corresponding to the first account.

19. The computer-implemented method of claim 1, wherein the first account or the respective second account is a resource storage account or a resource transfer account.

20. The computer-implemented method of claim 1, wherein when data is sent to a given target server the data is sent to an intermediate server for forwarding to the given target server.

21. A non-transitory, computer-readable medium storing one or more instructions executable by a computer system to perform operations comprising:

obtaining a binding request sent by a terminal device;
in response to obtaining the binding request, (i) determining a first account, and (ii) sending binding request feedback data to the terminal device, wherein the binding request feedback data comprises candidate binding objects for presentation by the terminal device;
obtaining binding object selection data sent by the terminal device, wherein the binding object selection data indicates a selection of one or more of the candidate binding objects presented by the terminal device;
in response to obtaining the binding object selection data, (i) determining, for each selected candidate binding object, a respective target binding object, based on the binding object selection data, and (ii) determining, for each respective target binding object, a respective target server; and
for each respective target server, (i) binding the first account to a respective second account of the respective target server, wherein the respective second account corresponds to a same user identity as the first account, and (ii) sending an account binding request to the respective target server, so that the respective target server binds the respective second account of the respective target server to the first account.

22. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining a binding request sent by a terminal device;
in response to obtaining the binding request, (i) determining a first account, and (ii) sending binding request feedback data to the terminal device, wherein the binding request feedback data comprises candidate binding objects for presentation by the terminal device;
obtaining binding object selection data sent by the terminal device, wherein the binding object selection data indicates a selection of one or more of the candidate binding objects presented by the terminal device;
in response to obtaining the binding object selection data, (i) determining, for each selected candidate binding object, a respective target binding object, based on the binding object selection data, and (ii) determining, for each respective target binding object, a respective target server; and
for each respective target server, (i) binding the first account to a respective second account of the respective target server, wherein the respective second account corresponds to a same user identity as the first account, and (ii) sending an account binding request to the respective target server, so that the respective target server binds the respective second account of the respective target server to the first account.

* * * * *